United States Patent
Palla et al.

(10) Patent No.: US 11,669,093 B2
(45) Date of Patent: Jun. 6, 2023

(54) MOBILE WORK MACHINE CONTROL BASED ON CONTROL ZONE MAP DATA

(71) Applicant: Deere & Company, Moline, IL (US)

(72) Inventors: Bhanu Kiran Reddy Palla, Bettendorf, IA (US); Nathan R. Vandike, Geneseo, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 417 days.

(21) Appl. No.: 16/831,249

(22) Filed: Mar. 26, 2020

(65) Prior Publication Data

US 2021/0302969 A1 Sep. 30, 2021

(51) Int. Cl.
| | | |
|---|---|---|
| A01B 79/00 | (2006.01) | |
| A01D 34/00 | (2006.01) | |
| A01D 34/835 | (2006.01) | |
| A01D 41/127 | (2006.01) | |
| G01C 21/36 | (2006.01) | |
| G05D 1/02 | (2020.01) | |

(52) U.S. Cl.
CPC ....... G05D 1/0212 (2013.01); G01C 21/3667 (2013.01)

(58) Field of Classification Search
CPC .. A01B 79/005; A01D 41/127; A01D 34/008; A01D 34/8355; G05D 1/0212; G05D 2201/0201; G05D 1/0274; G05D 1/0236; G05D 1/0214; G05D 1/0221; G05D 1/0253; G05D 1/0259; G05D 1/0276; G05D 1/0278; G01C 21/3667
USPC .......................................................... 701/23
See application file for complete search history.

(56) References Cited

U.S. PATENT DOCUMENTS

| | | | | |
|---|---|---|---|---|
| 2011/0270495 A1* | 11/2011 | Knapp | ................. | A01D 41/127 701/50 |
| 2013/0311050 A1* | 11/2013 | Cash | .................... | A01B 79/005 701/50 |
| 2015/0293507 A1* | 10/2015 | Burns | .................. | A01D 41/127 700/83 |
| 2017/0261978 A1* | 9/2017 | Gresch | .................... | G06Q 50/02 |
| 2018/0173223 A1* | 6/2018 | Doane | .................. | G05D 1/0255 |
| 2019/0389382 A1* | 12/2019 | Nishii | .................. | G05D 1/0278 |

OTHER PUBLICATIONS

Extended European Search Report issued in European Patent Application No. 21155794.7, dated Jul. 26, 2021 (09 pages).
https://green-infrastructure.esn.com/Landcover/Change/index.html, The Clark Labs 2050 Conterminous US Land Cover Prediction© 2016 Clark Lab, 3 pages.

* cited by examiner

*Primary Examiner* — Abby Y Lin
*Assistant Examiner* — Hossam M Abd El Latif
(74) *Attorney, Agent, or Firm* — Joseph R. Kelly; Kelly, Holt & Christenson, PLLC

(57) ABSTRACT

Control zones are identified on a thematic map and work machine actuator settings are identified for each control zone. A position of the work machine is sensed and actuators on the work machine are controlled based on the control zone that the work machine is in, and based upon the actuator settings corresponding to the control zone. The control zone is then divided, on a near real-time display, into a harvested portion of the control zone on which an observed condition value is shown, and control zone that has yet to be harvested, on which an estimated value of the condition is shown.

19 Claims, 13 Drawing Sheets

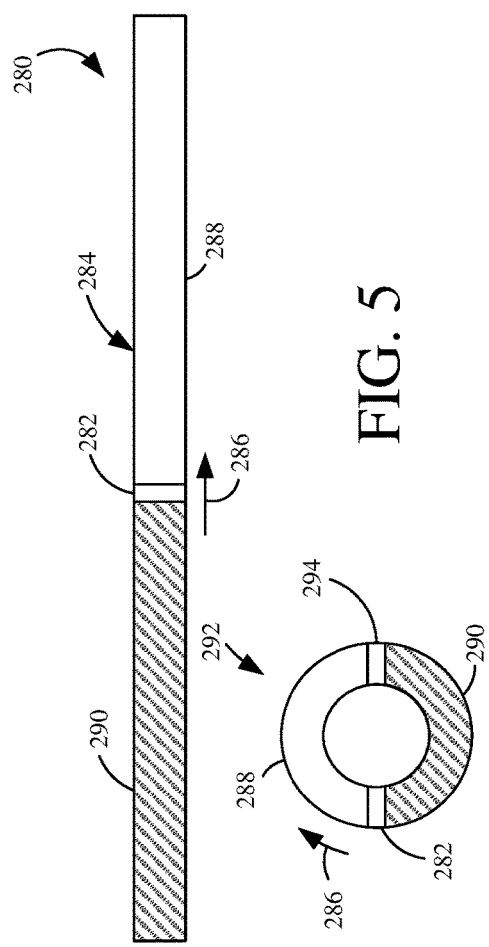
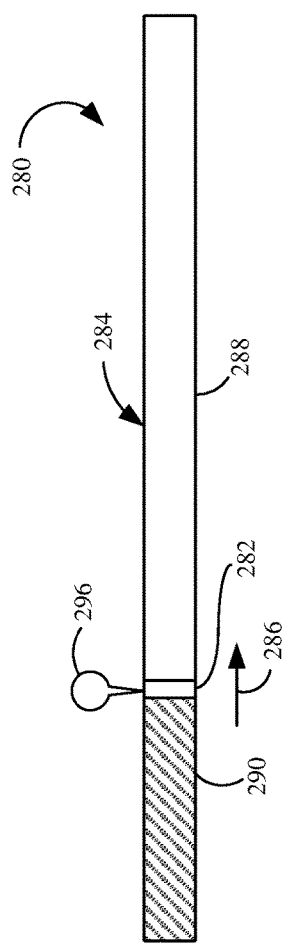
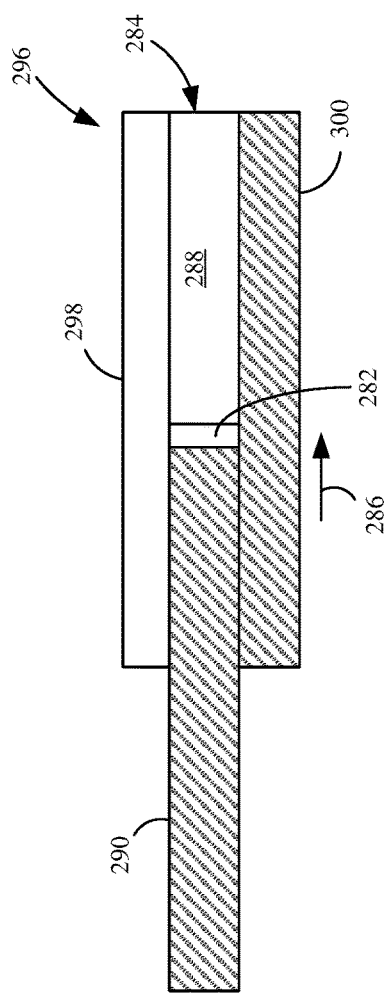

MOBILE WORK MACHINE CONTROL BASED ON CONTROL ZONE MAP DATA

FIELD OF THE DESCRIPTION

The present description relates to controlling a work machine. More specifically, the present description relates to controlling subsystems of a work machine differently, in different geographic areas, based upon parameter settings for control zones in the different geographic areas, and displaying the machine operation in near real time.

BACKGROUND

There are a wide variety of different types of mobile work machines. They include machines such as construction machines, turf management machines, forestry machines, agricultural machines, etc. In some current systems, a priori data is collected and used to generate a predictive map that predicts one or more different variables, that may be relevant to controlling the work machine, for a particular worksite. The map maps the variables to different geographic locations on the worksite. The maps are then used in an attempt to control the machine as it travels about the worksite performing an operation.

One particular example is in controlling an agricultural harvester. Some current systems attempt to collect a priori data (such as aerial imagery) and generate a predictive yield map from the a priori data. The predictive yield map maps predicted yield values, in a field being harvested, to geographic locations in that field. The systems attempt to control the work machine based upon the predictive yield map, as it travels through the field being harvested.

The discussion above is merely provided for general background information and is not intended to be used as an aid in determining the scope of the claimed subject matter.

SUMMARY

Control zones are identified on a thematic map and work machine actuator settings are identified for each control zone. A position of the work machine is sensed and actuators on the work machine are controlled based on the control zone that the work machine is in, and based upon the actuator settings corresponding to the control zone. A portion of the map is then divided, on a near real-time display window, into a completed portion on which an observed condition value is shown, and a future portion that has yet to be processed, on which an estimated value of the condition is shown.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-8 show examples of display elements, with actuatable mechanisms.

DETAILED DESCRIPTION

As discussed above, some current systems have attempted to use a thematic map (such as a yield map) created from a priori data (such as aerial imagery data or historical data) in order to control the work machine (such as a harvester). Other systems break the control model (e.g., the thematic map) into control zones by clustering the variable values represented on the thematic map. Each control zone has a set of settings for the controllable subsystems, or work machine actuators, so that, as the work machine enters a particular control zone, the controllable subsystems (or work machine actuators) are controlled based upon the corresponding settings in that control zone.

It will also be noted that the present description could proceed with respect to a number of different mobile work machines also referred to as work machines, machines or vehicles). Such machines can include a planter (with observed and estimated condition values, or control values, being soil moisture, planting depth, row unit down pressure, etc.), a sprayer (with observed and estimated condition values or control values being application rate, pest/weed location, etc.), tillage equipment (with observed and estimated condition and control values including ground residue coverage, disk angle, surface roughness, tillage depth, etc.), a construction compactor (with observed and estimated condition and control values including the degree of compaction), and a wide variety of other mobile work machines. However, the present description proceeds with respect to the work machine being a combine harvester (in which observed values and estimated values and control values can be header height, feedrate, sieve and rotor settings, fan speed settings, biomass/yield, etc.). It will be appreciated, though, that the present description could just as easily apply to the other work machines (or other construction, forestry, agricultural, and turf management work machines that are not listed).

Figure 1:
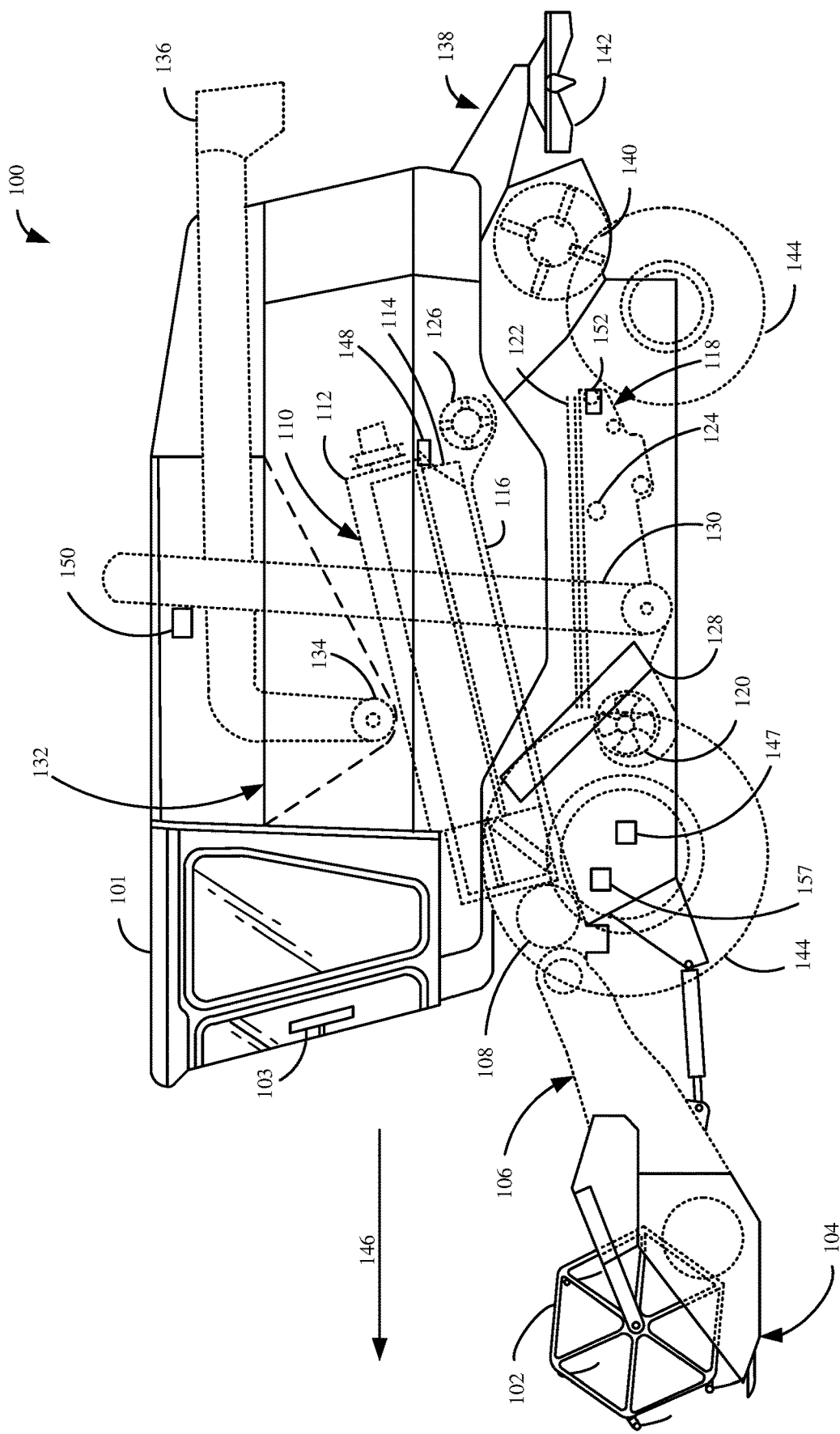
FIG. 1 is a partial pictorial, partial block diagram of a mobile work machine, in an example where the mobile work machine is a combine harvester.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, including display mechanism 103, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152, and position sensor 157. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by positioning system 157, such as a global positioning system (GPS), a dead reckoning system, a LORAN system, a cellular triangulation system, or a wide variety of other systems or sensors that provide an indication of travel speed and/or position.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feedrate, as it travels through clean grain elevator 130. They can sense yield (or biomass) as mass flow rate of grain through elevator 130 (or of biomass flowing through the machine), correlated to a position from which it was harvested, as indicated by position sensor 157, or provide other output signals indicative of other sensed variables. Some additional examples of the types of sensors that can be used are described below.

Figure 2:
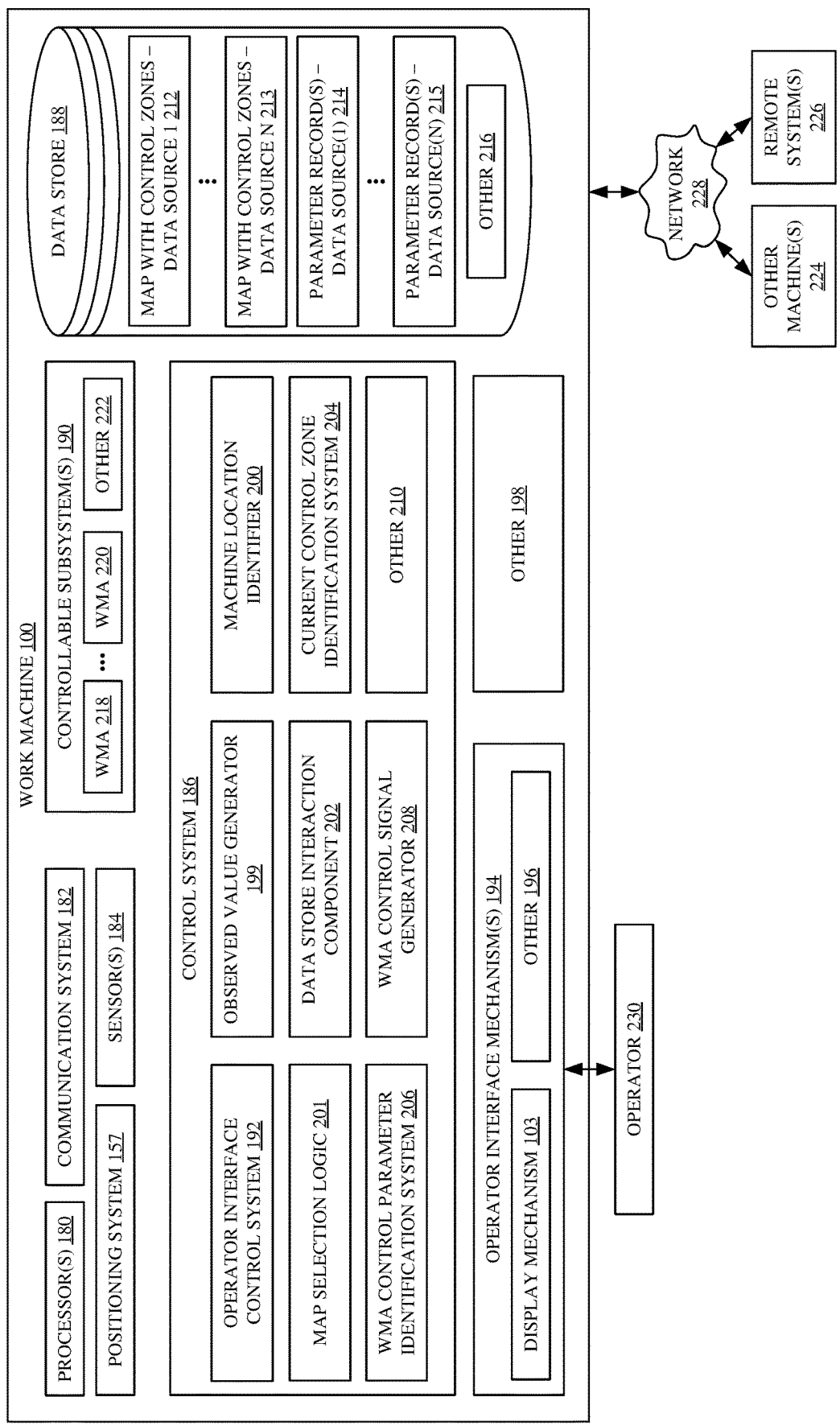
FIG. 2 is a block diagram showing one example of the mobile work machine illustrated in FIG. 1, with portions illustrated in more detail.

FIG. 2 is a block diagram showing some parts of the combine (work machine) 100, illustrated in FIG. 1, in more detail. FIG. 2 shows that machine 100 can be connected to other machines 224, and remote systems 226 over network 228. Therefore, network 228 can be a wide area network, a local area network, near field communication network, a cellular communication network, or any of a wide variety of other networks or combinations of networks. Other machines can be other harvesters in the same field in which work machine 100 is harvesting, or in different fields. Remote systems 226 can include farm manager systems, remote controller systems, vendor systems, etc.

FIG. 2 also shows that work machine 100 can include one or more processors 180, positioning system 157, communication system 182, and sensors 184 (which can be the same or different sensors from those described above with respect to FIG. 1).

Work machine 100 also includes control system 186, data store 188, one or more controllable subsystems 190, operator interface mechanisms 194 (which can include display mechanism 103, shown in FIG. 1 and other items 196). Work machine 100 can include a wide variety of other items as well, and this is indicated by block 198. Control system 186, itself, illustratively includes observed value generator 199, machine location identifier 200, map selection logic 201 data store interaction component 202, current control zone identification system 204, work machine actuator (WMA) control parameter identification system 206, control signal generator 208, operator interface control system 192, and it can include other items 210.

Data store 188 illustratively includes maps 211-213 that divide the field in which machine 100 is operating into control zones, a plurality of different parameter records 214-215, and it can include other items 216. Controllable subsystems 190 can include a plurality of different work machine actuators 218-220, and it can include other items 222. The work machine actuators 218-220 can include actuators to drive any of the function ability described above with respect to FIG. 1, or other actuators. Prior to describing the overall operation of machine 110, a brief description of some of the items in machine 110, and their operation, will first be provided.

Communication system 182 enables communication among items on work machine 100, and over network 228. Therefore, communication system 182 may vary, based on the type of communication that it is enabling.

In control system 186, map selection logic 201 selects a map 211-213 to be used in controlling machine 100. Maps 211-213 map control parameters, or field/crop condition estimates to different zones in the field. The map can divide the field into different geographic zones based on one or more different criteria. For instance, the mapped geographic zones may be control zones that are generated as geographic regions with similar machine setting values, so that, as machine 100 enters a geographic location corresponding to a control zone, machine 100 uses the setting values from that control zone to control machine 100. The zones may be environmental zones that are generated as geographic regions with similar environmental (e.g., crop/field) characteristics. The machine can also be controlled based on the environmental characteristics as well. The zones can be generated in other ways as well. The mapped zones are referred to herein as control zones.

In one example, there may be different maps that have data generated from different sources, such as aerial imagery, LIDAR, etc. It may be that the data from one data source is of a higher quality (e.g., has a higher confidence level or accuracy) than data from other sources. In one example, there may be a set of NVDI images collected at various times during the growing season. Prior research may have generated correlation coefficients between NDVI images of a field at a given growth stage and yield. The correlation coefficients can then be used to generate a confidence level in estimated yield. In another example, there may have been a crop stressing event in the later part of the growing season which would lower confidence in earlier season NDVI images and increase the relative confidence in late season NDVI or at-harvest lidar or camera images to predict yield or biomass. Map selection logic 201 selects a map 211-213 that has data with a highest quality. It can select the map for other reasons as well. Also, there may be different maps for different control parameters or different condition value estimates. Further, in another example, a single map can have multiple values mapped into zones.

Machine location identifier 200 receives the position of machine 100 from positioning system 157. For instance, it can receive coordinates in a local or global coordinate system. It then identifies a location and heading of the machine 100 in a particular field where it is harvesting. Observed value generator 199 receives sensor inputs and generates an observed value for the portion of the field that has already been harvested. For example, if the condition variable is feedrate, then the input from one or more sensors that sense a variable indicative of feedrate is received and generator 199 generates an observed feedrate value correlated to geographic position output by machine location identifier 200. Data store interaction component 202 interacts with data store 188 to obtain the map 211 with control zones (if it has not already retrieved it) and identify a location of machine 100 relative to the control zones in map 211. Control zone identification system 204 identifies a current control zone that machine 100 is operating in, and data store interaction component 202 obtains the parameter records 212-215 for that particular control zone. When the values in the control zone are used to control WMAs, then WMA control parameter identification system 206 extracts the values of the WMA settings (or parameters) from the parameter records (for the current control zone) and provides those values to control signal generator 208. Control signal generator 208 generates control signals and applies them to WMAs 218-220 in controllable subsystems 190, based upon the particular WMA parameters (or WMA settings values) identified for the current control zone that machine 100 is operating in. Thus, control system 186 controls the controllable subsystems 198 based upon the parameters (or WMA settings values) corresponding the control zones in the map 211, as work machine 100 travels through the field. It also controls machine 100 based on any predicted or estimated conditions in the field and gathers data to generate an observed value for the condition.

In one example, the different control zones may correspond to areas where different settings values would work best. In that case, control system 186 identifies which control zone machine 100 is in, and what settings values are to be used. Control signal generator 208 then generates control signals to control the controllable subsystems 190 using those settings values. As machine 100 traverses from one control zone to another control zone, the parameter or settings values for the new control zone for the corresponding WMA are obtained and the work machine actuators are controlled based upon the new parameters or settings values.

Similarly, as machine 100 travels across a zone, it generates an observed value for a field condition in that zone. The observed value can then be used to correct the estimated value in the map 211. The difference between the two values (estimated and observed) can be characterized. In some examples, map 211 is implemented as a set of layers wherein each layer is dedicated to a separate set of georeferenced data or information. Example map layers without limitation include field boundaries, as-harvested yield, predicted yield, predicted biomass, past grain losses, predicted grain losses, and other.

Operator interface control logic 192 generates outputs on operator interface mechanisms 194 and detects operator inputs or interactions with the operator interface mechanisms. The operator interface mechanisms can include display mechanism 103, which may be a touch sensitive display or a display that operator 230 can interact with using a point and click device, etc. Mechanisms 194 can include a wide variety of other mechanisms such as a microphone and speakers where speech recognition and speech synthesis are used. Mechanisms 194 can include foot pedals, joysticks, steering wheel, levers, linkages, buttons, switches, etc.

As is described in greater detail below, operator interface control logic 192 can generate a representation of a near real-time display window showing at least a portion of the field in which work machine 100 is operating and the location and heading of work machine 100. The near real time display window can also display zones of the map which include control zones. In one example, the operator can zoom in and out of the map so more or less of the map is shown in the near real time display window. Depending on the level of zoom, the display window may show less than one control zone, one control zone, more than one control zone, or portions of multiple control zones. It can output the representation of the near real time display for display on display mechanism 103. The display window also shows the various different parameter settings values that are currently being used, and/or the estimated and observed condition values, in the current control zone. As machine 100 passes over an area in the field, the observed value is generated by machine 100 based on sensor signals it receives in that area. Some examples of the near real time displays are discussed in more detail below with respect to FIGS. 4-10.

The present description proceeds with respect to a system in which worksite conditions can be displayed, in near real time, along with the control zones. The display window is divided into an observed condition zone portion, which indicates the actual value of the worksite condition that was sensed or observed by the machine 100, and an estimated condition zone portion which corresponds to a location in the map that has not yet been traversed by the machine 100. The estimated condition zone portion of the display window shows an estimated value of the worksite condition. The display window also shows a current location of the mobile work machine relative to the observed condition zone portion and the estimated condition zone portion. The present system can also be used to allow the operator to change the display window to modify the proportion of the display window used for the observed condition zone portion relative to the estimated condition zone portion. Further, a wide variety of other information and functionality is discussed herein as well. Depending on the level of zoom, observed condition zone portion and estimated condition zone portion may show less than one control zone, one control zone, more than one control zone, or portions of multiple control zones from the map.

Figure 3:
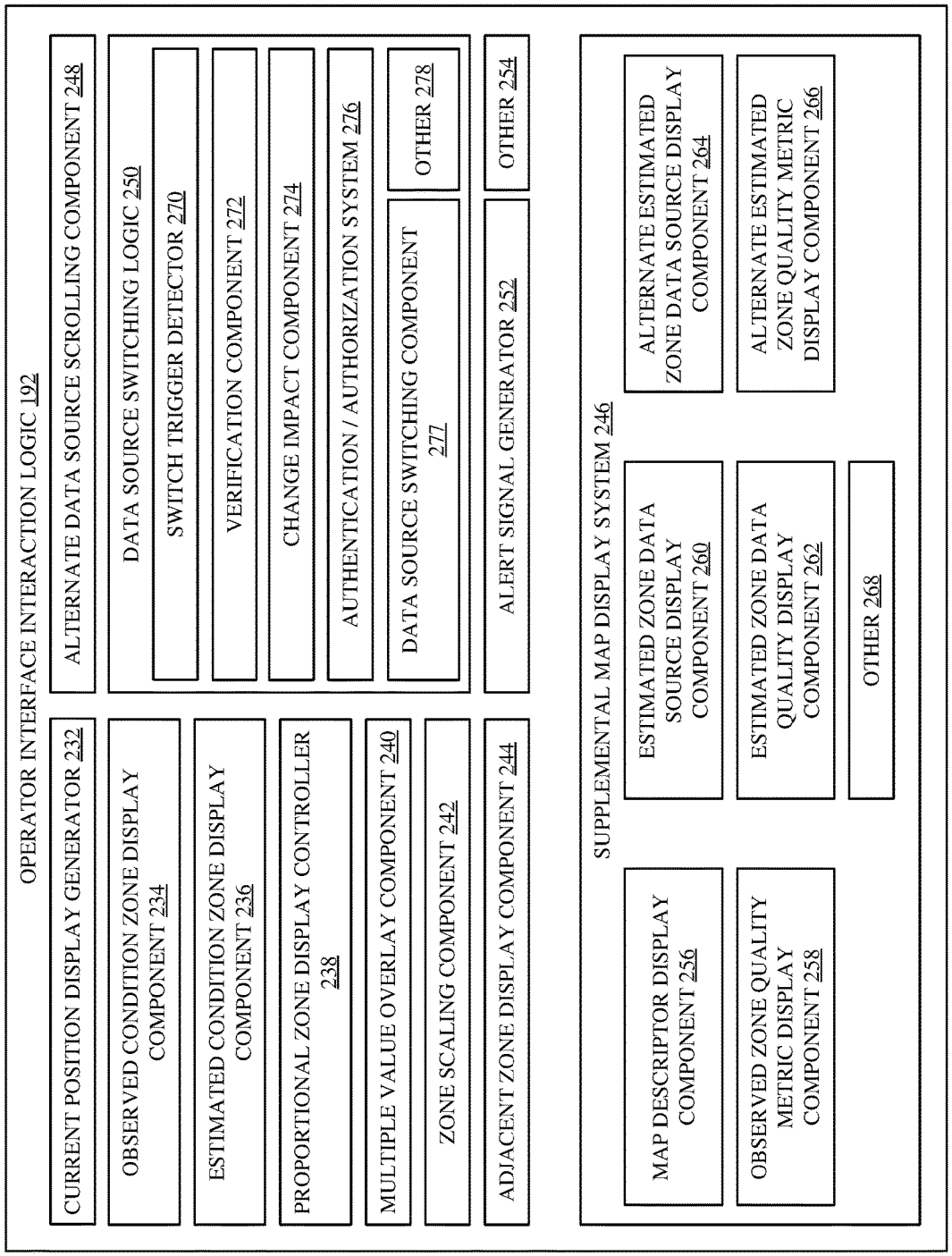
FIG. 3 is a block diagram showing one example of an operator interface control system, in more detail.

FIG. 3 is a block diagram showing one example of operator interface control system 192 in more detail. In the example shown in FIG. 3, system 192 includes current position display generator 232, observed condition zone display component 234, estimated condition zone display component 236, proportional zone display controller 238, multiple value overlay component 240, zone scaling component 242, adjacent zone display component 244, supplemental map display system 246, alternate data source scrolling component 248, data source switching logic 250, alert signal generator 252, and it can include a wide variety of other items 254. Supplemental map display system 246, itself, illustratively includes map descriptor display component 256, observed quality metric display component 258, estimated zone data source display component 260, estimated zone data quality display component 262, alternate estimated data source display component 264, alternate estimated zone quality metric display component 266, and it can include other items 268. Data source switching logic 250, itself, can include switch trigger detector 270, verification component 272, change impact component 274, authentication/authorization system 276, data source switching component 277, and it can include other items 278.

Again, before describing the overall operation of machine 100 in more detail, a brief description of some of the items in interface control system 192 will first be described.

Current position display generator 232 illustratively obtains the current position of machine 100 from machine location identifier 200, and generates a display element indicative of that position. Observed condition zone display component 234 and estimated condition zone display component 236 receive an observed value from observed value generator 199, and an estimated condition value from the map 211, and together, display a zone display element, in a display window, with a an observed condition zone portion that corresponds to an area in the field that has already been traversed by machine 100 and has the observed condition values displayed, and an estimated condition zone portion that corresponds to an area in the field that has yet to be traversed by machine 100, and has the estimated condition values displayed. The current position display generator 232 generates a display element at the junction between those two zone portions in the near real-time display window, to show the position of machine 100.

Proportional zone display controller 238 allows operator 230 to shift the amount of the display surface in the display window that is attributed to the estimated condition zone portion and the observed condition zone portion. Therefore, if the operator wishes the display window to show more of the observed condition values, then the operator can shift the proportionality of the display window to show more observed condition values than estimated condition values. Alternatively, if the operator wishes to see more of the estimated condition values, then operator 230 can modify the display window to do that.

Multiple value overlay component 240 can overlay multiple values on the zone displayed in the display window, as is described in greater detail below. Zone scaling component 242 allows operator 230 to zoom in on the estimated condition zone portion, or the observed condition zone portion, or both, to see those portions of the zone, in the display window, in more detail. Adjacent zone display component 244 can display, in the display window, values for the estimated condition, and/or observed condition, for map areas that are adjacent the observed condition zone portion or estimated condition zone portion, in the field in which machine 100 is operating.

Supplemental map display system 246 can display supplemental information in the near real-time display window, in addition to the mapped current location of vehicle 100 and the estimated and observed zone portion. Map descriptor display component 256 generates a display element that describes the zone displayed on the near real-time display window. Observed zone quality metric display component 258 generates a display element indicative of how closely the observed condition value matches the estimated condition value. Estimated zone data source display component 260 identifies the data source for the estimated condition values that are being displayed in the estimated condition zone portion. Estimated zone data quality display component 262 generates a display element indicative of the quality of the estimated data. Alternate estimated zone data source display component 264 generates a display element that indicates that there is one or more alternate data source for the estimated condition values, that the operator can switch to. It also identifies those data sources. For instance, the data source display component 264 can generate a display element that indicates that the data was generated from NDVI data, LIDAR data, etc. Alternate estimate zone quality metric display component 266 generates a quality metric indicative of the quality of the data generated by the alternate data source. For instance, it may be that data generated based on NDVI data has a relatively high quality metric, relative to data generated based on LIDAR. A metric indicative of this quality level is generated and displayed.

In an example in which the near real-time display window shows alternate data sources, there may be more alternate data sources than can be conveniently displayed in the display window. In that case, a scrolling mechanism may be provided. Alternate data source scrolling component 248 detects interaction with that scrolling mechanism, and scrolls information displayed in the display window to display additional alternate data sources, in response. In other examples, alternate data source scrolling component 248 may present alternative data sources as drop down menus, carousels, or other.

Data source switching logic 250 detects whether to switch to an alternate data source. If so, logic 250 switches to the alternate data source for purposes of controlling the WMAs, and for purposes of generating the near real-time display window as well. Switch trigger detector 270 detects a trigger indicating that the operator wishes to switch the data source or that an automated trigger has been detected. This can be by detecting the operator interacting with an interface mechanism representing an alternate data source, or by a machine performance metric falling below a threshold value, or in other ways.

Verification component 272 verifies that the operator wishes to switch data sources. For instance, in work machine 100, it is not uncommon that the terrain over which it is traveling may be bumpy or uneven. This may cause the operator to inadvertently actuate an interface mechanism indicating that the user wishes to switch data sources. Therefore, instead of instantly switching data sources, it may be that verification component 272 prompts the operator to verify that he or she wishes to switch to the alternate data source. For example, the prompt may be a secondary interface mechanism that the operator is to actuate, or in other forms.

Change impact component 274 may be provided to inform the operator of the impact of the change. For instance, change impact component 274 may generate a display popup window, or another display element. By way of example, assume that, by choosing an alternate data source, this may result in the ground speed of machine 100 being increased. In that case, change impact component 274 may display a message indicating that, by switching to the alternate data source, the speed of the combine will be increased, which will likely result in losing an additional 0.5 bushels per acre (e.g., the impact of switching may result in increased crop loss). This is just one example.

Authentication/authorization system 276 can be provided to implement authentication and authorization processes. For instance, there may be a hierarchy of individuals that are authorized to view and change to alternate data sources. By way of example the near real-time display window may be generated locally on the machine, only, or it may also be generated at one or more remote locations. In some examples, each physical display device may be associated with a person or a user permission level. The user permission level may be used to determine which display elements are visible on the physical display device, and which values the corresponding person may change. As an example, a local operator of machine 100 may be unable to see the information corresponding to alternate data sources, or make any changes to machine operation. A supervisor, at a remote location, however, may be able to see the alternate data information on the display, but not make changes. A manager, who may be at a separate remote location, may be able to see all of the elements and also change the data source that is used in machine control. This is one example of an authorization hierarchy that may be implemented.

Thus, system 276 ensures that the operator 230 (or whoever is attempting to change to an alternate data source) is properly authorized to see the data corresponding to the alternate data source and to change to the alternate data source. Similarly, system 276 can provide authentication logic in which case the operator is authenticated. This may include using passwords, biometrics, etc.

FIGS. 4-9 show a plurality of different examples of display elements that may be shown on a near real-time display window. Some of the display elements may be actuatable by the operator 230, or by other users who can see the near real-time display at remote locations.

FIG. 4 shows a map display element 280 that can be displayed in a near real-time display window on a display device. Current position display generator 232 (shown in FIG. 3) generates a current position icon (or display element) 282 that represents the current position of machine 100 within a control zone 284 in a field in which machine 100 is operating. It will be noted that, at a given instant, depending on zoom level, the display window that is generated may show less than a full control zone, a single control zone, or more than one control zone. FIG. 4 shows an example, in which a single control zone is shown.

In the example illustrated in FIG. 4, it is assumed that machine 100 is moving, within the control zone 284, in the direction indicated by arrow 286. Display element 282 can be an icon, a pictorial depiction of machine 100, or another display element. In the example shown in FIG. 4, the current position display element 282 separates a predicted condition zone portion 288 from an observed condition zone portion 290. The predicted condition zone portion 288 represents an area along a predicted path of mobile machine 100, in zone 284. Therefore, the predicted condition zone portion 288 visually represents a predicted value for a condition variable that is predicted based on a priori or in situ data. By way of example, the predicted condition zone portion 288 may represent a predicted feedrate for zone portion 288. In that example, predicted feedrate values are displayed at different locations in the predicted condition zone portion 288 to represent predicted feedrate that will be encountered at different geographic locations in the zone, as machine 100 travels through the control zones in the field. When the feedrate at a certain area in the field changes significantly such that the feedrate machine settings will be changed, then this is represented as a separate control zone corresponding to that area in the field.

The observed condition zone portion 290 shows a visual representation of observed values for the particular condition. Thus, in an example in which the condition being represented is feedrate, the observed condition zone portion 290 represents feedrate values that were observed by mobile machine 100, based on sensor values it received, as it traveled through the portion of the zone represented by zone portion 290.

It will be noted that, for purposes of the present description, the display element 280 is shown in a generally horizontal orientation on the display device, with the machine traveling from left, to right, across the zone, in the direction indicated by arrow 286. However, the direction of travel could be different, such as from right to left. In that case, the zone portions 288 and 290 are swapped to reflect the predicted and observed values. In yet another example, the display element 280 may have its elongate axis rotated (such as rotated 90° counter-clockwise) from that which is illustrated in FIG. 4.

On the display shown, movement of machine 100 through the field can be represented in a number of different ways. In one example, the current position indicator 282 remains fixed, and the zone portions 288 and 290 scroll through the display window in a direction opposite the direction indicated by arrow 286. This gives the impression that the current position indicator 282 is moving over the zone portions. As the zone portions 288 and 290 scroll, the values represented in zone portions 288 and 290 are updated accordingly.

Similarly, display element 280 is shown generally in the shape of a rectangle, but it could represent the control zone in other ways as well. For example, FIG. 5 shows a display element 292 that is generally ring-shaped. The display portions on display element 292 are similar to those shown on display element 280 in FIG. 4, and they are similarly numbered. The current position display element 282 can be fixed, with zone portions 288 and 290 rotating, in the display window, about element 282. In another example, the current position display element 282 travels about the ring display element 292, and the zone portions are updated accordingly. A delimiter zone portion 294 is shown to separate the two zone portions 288 and 290.

FIG. 6 is similar to FIG. 4, and similar items are similarly numbered. However, FIG. 6 shows that proportional zone display controller 238 provides functionality so that the operator can move current position display element 282 along the elongate axis of the control zone 284 in the display window so that more of the predicted condition zone portion 288 is shown in the display window relative to observed condition zone portion 290, or it can be moved from left to right so that less of the predicted condition zone portion 288 is shown, and more of the observed condition zone portion 290 is shown. In one example, the operator can actuate this feature by providing a suitable operator input. By way of example, on a touch screen display, the operator can simply touch and drag the current position display element 282. In another example, the operator can provide a trigger (such as by tapping display element 282) and proportional zone display controller 238 then displays a handle display element 296, which the operator 230 can grab and move to the left or right by touching and dragging. In another example, the operator 230 can move display element 282 or 296 using a point and click device, or using a voice command, such as "move current position display element to 25%." In such an example, the current position display element 282 is moved to the left in the display window so that it is at a position 25% of the way from the far left of the display window in FIG. 6 to the far right of the display window in FIG. 6.

It should also be noted that, in the examples shown in FIGS. 4-6, the zone portions 288 and 290 are shown as a solid portion, and as a cross-hatched portion, respectively. In such an example, the solid portion represents one value for the predicted condition, while the cross hatched portion represents another value for the observed condition. However, it is to be noted that there would likely be variation of visual indicia within each zone portion 288 and 290, to reflect the fact that both the estimated value of the condition and the observed value of the condition would change at different locations within those two zone portions.

The visual indicia used to represent different values can vary widely. For instance, the different values can be depicted within the zone portions 288 and 290 by varying the color of the zone portions, the patterns shown in the zone portions, the visual intensities shown in the zone portions, by displaying numeric values at different locations within the zone portions, by displaying alpha-numeric levels (such as high, medium, low, etc.), or in a wide variety of other ways.

Similarly, the predicted condition zone portion 288 and the observed condition zone portion 290 may use different visual schemes to represent the different values. In one example, the predicted condition zone portion 288 may use patterns to show different values while the observed condition zone portion 290 may use different colors. These are examples only.

It will also be noted that, in one example, multiple value overlay component 240 can display multiple values, in the display window, for multiple different variables, on zones 288 and 290. For example, the value for predicted biomass in zone 288 may be shown with different colors, while the predicted value for feedrate in zone 288 may be overlaid as a series of patterns (reflecting the different values at different locations), and numeric values may be displayed in zone 288 to represent a value that is used to control harvester speed. To do this, multiple value overlay component 240 illustratively extracts these values from the map 211 and one or more parameter records 214-215. It then generates the display elements (colors, patterns, numeric values, etc.), and correlates them to the position in zone 284, based upon the map, and based upon the current location of mobile machine 100, and then displays them at the proper location in zone portion 288 in the display window. The same can be done for observed condition zone portion 290. For instance, the observed value of biomass may be shown with different colors in zone portion 290, while the observed feedrate can be overlaid as different patterns. Numeric values may represent the actual harvester speed, which may also be displayed in zone portion 290.

In another example, zone scaling component 242 enables functionality that allows user 230 to scale the predicted condition zone portion 288 and the observed condition zone portion 290, independently of one another. In one example, the scaling is done by zooming in on, or zooming out of, the corresponding zone portion using a touch gesture, a scroll bar, zoom in and zoom out buttons, or other mechanisms. The zone portions are illustratively scaled at least in one dimension (such as along the direction of travel indicated by arrow 286). In one example, the dimension perpendicular to machine direction of travel may be fixed and only the path dimension (along the direction of travel) changes scale. This is just one example and others can be used as well.

Assume, for the sake of example, that one inch on the display window corresponds to 100 feet in the field. The scale may be changed, for instance, so that one inch on the display window corresponds to 500 feet in the field. The operator 230 may have a variety of different reasons for changing the scale. By way of example, if the observed or predicted values are relatively constant, then the operator may change the scale so that one inch of display window space corresponds to a larger length of travel of the machine. However, if the observed or predicted values change relatively frequently, then the operator may scale the displayed zone portion so that one inch of display window space corresponds to a relatively low value of linear travel of machine 100.

FIG. 7 shows another example of a display element 296. Display element 296 includes the display element corresponding to control zone 284, and elements in control zone display element 284 are similarly numbered to those shown in FIGS. 4 and 6. However, FIG. 7 also shows that, in one example, adjacent zone display component 244 obtains predicted and observed condition values for locations adjacent to the past or predicted path of machine 100. (in the field in which machine 100 is operating) and displays them on the display window. FIG. 7 shows that user interface display element 296 includes an adjacent predicted condition display zone portion 298, and an adjacent observed condition display zone portion 300. Machine 100 has already traversed the adjacent portion of the field corresponding to zone 300, but has not yet traversed the adjacent portion of the field corresponding to zone 298. Thus, it can be seen that zones 298 and 300 correspond to data for adjacent passes of machine 100 (adjacent to the current pass), in the field. The adjacent zone data may be helpful to an operator 230 because they show values for adjacent passes that the operator is near, on machine 100. This may allow operator 230 to anticipate settings changes, among other things. The adjacent zone data can be accessed by adjacent zone display component 244 accessing the values in map 211 for the adjacent field portions, and the corresponding parameter records.

Figure 8:
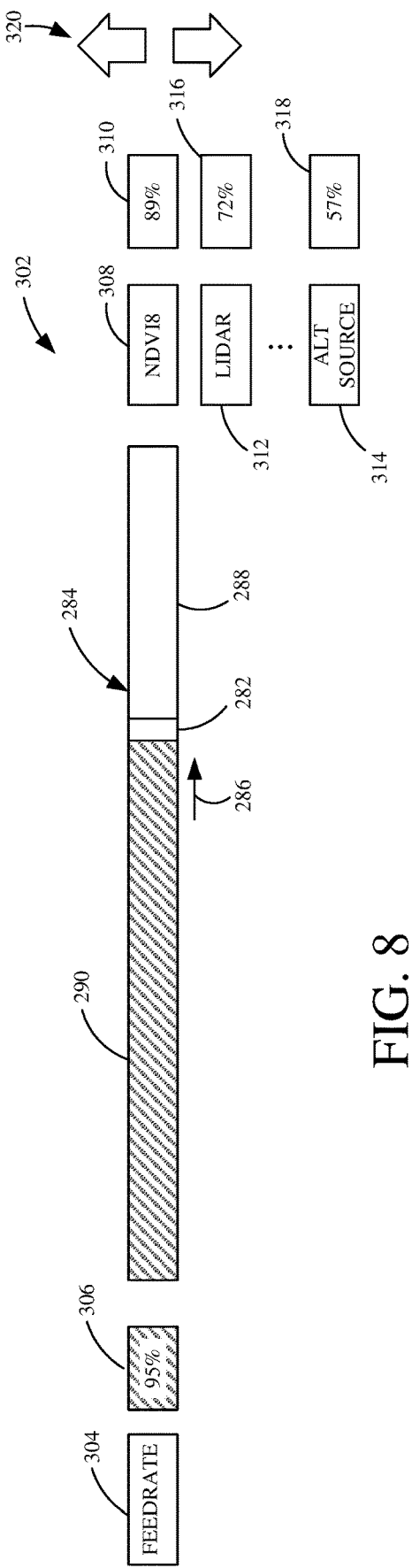

FIG. 8 shows another example of user interface display 302 that can be displayed in the display window. Display 302 includes zone display element 284, which is similar to that shown in FIGS. 4, 6 and 7, and similar items are similarly numbered. However, FIG. 8 shows that supplemental map display system 246 has now displayed additional or supplemental information along with zone display element 284. FIG. 8 shows that map descriptor display component 256 generates a map descriptor display element 304. Map descriptor display element 304 illustratively names a control parameter or work attribute related to the zone display element 284. In the example shown in FIG. 8, the map descriptor display element 304 shows that zone display element 284 is showing predicted values (in zone portion 288 of the display window) and observed values (in zone portion 290) for feedrate.

It will be noted that the control parameters or work attributes that are displayed in a zone display element of the display window (such as 284) can include a wide variety of different control parameters or work attributes. When mobile machine 100 is a harvester, such values may be values for header height, feedrate, sieve settings, rotor settings, fan speed settings, chaff spreader settings, biomass, yield, and a wide variety of other items. When machine 100 is a tillage machine, such control parameters or work attributes may include values for surface roughness, residue coverage, tillage depth, disc angle, among a wide variety of other items. When the machine 100 is a planting or seeding machine, the control parameters or work attributes may include planting depth, seed orientation (which may be obtained from other applications), among a wide variety of other items.

FIG. 8 also shows that observed zone quality metric display component 258 generates an observed zone quality metric display element 306. Element 306 illustratively provides a measure of the prediction accuracy of values in zone portion 288 compared to the measured or observed values in zone portion 290. In the example illustrated in FIG. 8, the 95% value is an accuracy of the predicted feedrate (e.g., the predicted feedrate had a calculated error of 5% of the actual feedrate). In one example, component 258 may compare the observed condition zone quality metric to a threshold value and generate a visual indicator, indicating how the zone quality compares to the threshold value. For instance, the background color of observed condition zone quality display element 306 may indicate that the numeric value (or 95%) is within a threshold corresponding to a "good" accuracy level. Other colors or visual indicia may mean that the comparison falls in other categories.

As discussed above, there may also be alternate data sources from which the predicted values in zone portion 288 can be obtained. Estimated zone data source display component 260 generates a predicted zone data source identifier 308. Identifier 308 provides visual indicia identifying the data source for which the current predicted values in zone portion 288 are obtained. In one example, element 308 uses alphanumeric characters to name the data source, itself. In the example shown in FIG. 8, element 308 includes an alphanumeric identifier "NDVI 8". This indicates that the data is derived from an NDVI image of the field taken at growth stage V8. The element 308 may identify any of a wide variety of other data sources by the name of the sensor that collected the data (e.g., LIDAR), or by the name of a custom weighting of multiple inputs (such as "Jupiter 2"), etc.

Estimated zone data quality display component 262 generates a predicted zone data quality display element 310. Display element 310 displays a visual indicator of a quality metric, or confidence level, corresponding to the data in the predicted condition zone portion 288. The predicted quality metric can be based wholly or partially on past performance of the data from the data source in terms of quality (e.g., accuracy). In another example, the predicted quality metric is based on other criteria, other than past performance. In the example shown in FIG. 8, the value of "89%" is shown. The background color (or other visual indicia on element 310) can also be indicative of the marginal goodness of the value displayed (89%) relative to one or more threshold values.

Also, as discussed above, it may be that there are alternate data sources for the predicted values shown in zone portion 288. Alternate estimated zone data source display component 264 can generate display elements corresponding to those alternate data sources. Alternate estimated zone quality metric display component 266 illustratively generates display portions indicative of the quality of the data provided by the alternate data sources. In the example shown in FIG. 8, component 264 generates and displays display elements 312 and 314 corresponding to alternate data sources generated from LIDAR and "ALT source".

Component 266 generates display elements 316 and 318 indicating the quality of the data from the alternate data sources identified by elements 312 and 314, respectively. It can be seen in FIG. 8 that the quality of the data from the data source represented by element 308 is 89%, while the quality of the data from the alternate data sources is 72%, and 57%, respectively.

In one example, there may be more alternate data sources than can be displayed in the display window on the display mechanism. In that case, alternate data source scrolling component 248 generates an alternate data source scrolling element 320 that can be actuated by operator 230. The operator 230 can actuate display element 320 in order to scroll through a list of possible alternate data sources.

Data source switching logic 250 illustratively provides functionality so that the data source that is used in generating the values in zone portion 288 (and thus the values displayed in zone portion 288, and the values used in controlling machine 100, as it travels over the field corresponding to display portion 288), can be switched from a current data source to an alternate data source. In such an example, data source switching logic 250 detects when the switch of data sources has been triggered, and accomplishes the switch to the alternate data source.

Switch trigger detector 270 detects a switch trigger indicating that the data source is to be switched from a current data source, to an alternate data source. In one example, this can be an automated trigger based on switching criteria. For instance, it may be that the quality value in display element 310, corresponding to the current data source, falls below the quality value in display element 316, corresponding to an alternate data source. In that case, switch trigger detector 270 may detect a trigger indicating that a switch to an alternate data source represented by display element 312 is to be made. In another example, if a performance parameter, or a quality value in display element 306, falls below a threshold value, this may be a trigger detected by switch trigger detector 270 indicating that a switch to a different data source is to be made. In yet another example, switch trigger detector 270 detects an operator input indicating that the operator wishes to switch to an alternate data source. For example, on a touch sensitive display screen, the operator may touch display element 312 to select the alternate data source that the operator wishes to switch to. In another example, the alternate data source may be triggered by a button click, a voice command, etc.

In one example, a switch to a new data source is verified prior to the switch actually occurring. In such an example, verification component 272 performs a verification operation to ensure that the operator 230 (or another user providing the switch trigger) wishes to switch to the alternate data source. For instance, the prompt may be a visual or synthesized speech prompt, such as "Are you sure you want to swap from data source A to data source B?" Verification component 272 may then detect an affirmative response. This type of verification may reduce the likelihood of accidentally switching the data source.

Change impact component 274 also illustratively generates an output that can be surfaced for operator 230 (or another user making a change to the data source) indicating the impact of the change. Thus, before confirming the change to the alternate data source, component 274 may communicate the impact of that change visually, by an audio output, or in another way. In one example, component 274 generates a popup window that shows one or more display elements that are altered to indicate how they would appear if the change was carried out. For example, component 274 may generate a display showing elements 312 and 308 swapped. It may generate a display showing display elements 310 and 316 swapped. Further, component 274 may generate a display showing the estimated values in predicted condition zone portion 288 swapped to show those derived from the alternate data source. Further, component 274 may generate a textual output or a different output indicating other impacts. By way of example, if switching to the alternate data source would cause the speed of machine 100 to increase, and that would negatively affect some other performance characteristic, that type of impact may be surfaced for operator 230 (or another user invoking the data change). As one example, component 274 may generate a textual output such as "changing to alternate data source B will increase the speed of the machine, resulting in an additional crop loss of 0.5 bushels per acre." Again, this is just one example, and a wide variety of other impact indicators can be used as well.

Authentication/authorization system 276 enforces authentication and authorization processes, when desired. For instance, as discussed above, certain operators or users may be only entitled to see certain display elements, and to invoke certain functionality (such as changing to an alternate data source). Thus, before any changes or displays are generated, authentication/authorization system 276 makes sure that the operator or other user initiating such operations or viewing the display is authenticated, and is authorized to do so.

Once the data source switching process has been triggered, verified and authenticated/authorized, then data source switching component 277 performs a data source switch. It provides an output to control system 186 indicating that the data source which control is based on has been switched to an alternate data source. Data store interaction component 202 then obtains data from that data source from data store 188. Control system 186 then uses that data, from the alternate data source, in generating the near real-time display and controlling the controllable subsystems 190.

It will be noted that, at any time during the processing, an alert condition may arise. In one example, the alert may be generated based on the transition of some value across a threshold. For example, if the value of the observed zone quality metric shown in display element 306 drops below a threshold of 90%, then alert signal generator 252 may generate an alert signal which drives a speech synthesis system to announce an alert message such as "Observed zone quality drop". In another example, the background color of the display element that triggered the alert may change color. In another example, the background may change from a static background to a flashing red background (or another flashing or blinking background). In yet other examples, alert signal generator 252 may generate an alert signal which causes another visual effect, such as a sequenced pattern of visual items. It may generate an audio effect such as an alert tone, a spoken alert or other audio output. It may generate a control signal that drives a haptic output (such as vibration of the display or another surface, vibration of the operator seat, or another operator interface mechanism, etc.). Alert signal generator 252 may generate an alert signal to control these or different alert mechanisms or combinations of mechanisms.

Figure 9:
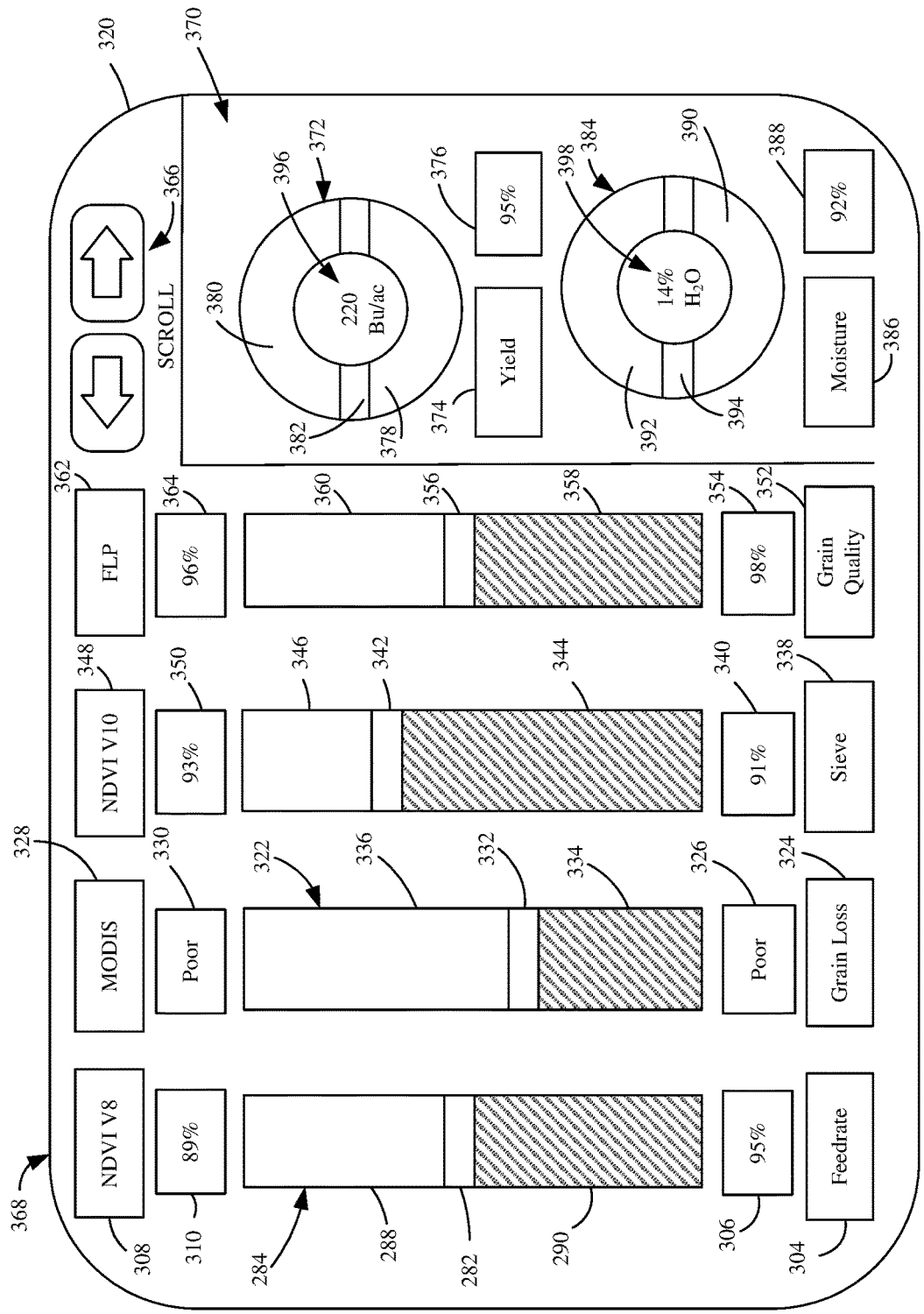
FIG. 9 shows one example of an operator interface display with a plurality of display elements.

FIG. 9 shows an example of a user interface display 320 that includes a plurality of display elements that have a form that has already been described. In the example shown in FIG. 9, instead of being oriented generally horizontally on the display surface, the display elements are oriented generally vertically. Some items are similar to those shown in previous figures, and they are similarly numbered. For instance, zone display element 284 with corresponding additional elements is shown on the left side of the display illustrated in FIG. 9. Zone display element 284 is showing values for feedrate. Another zone display element 322 is shown for grain loss. The map descriptor display component 256 generates a map descriptor display element 324, and observed zone quality metric display component 258 generates observed zone quality display element 326. Estimated zone data source display component 260 generates an estimated zone data source display element 328, while estimated zone data quality display component 262 generates an estimated zone quality display element 330. Current position display generator 232 generates a current position display element 332. Observed condition zone display component 234 generates an observed condition zone display portion 334, and estimated condition zone display component 236 generates an estimated condition zone portion 336.

FIG. 9 also shows that a display for sieve settings includes a map descriptor display element 338, observed zone quality metric display element 340, current position display element 342, observed condition zone display portion 344, estimated condition zone display portion 346, estimated zone data source display element 348 and estimated zone data quality display element 350. FIG. 9 shows a corresponding set of display elements 352, 354, 356, 358, 360, 362 and 364 for grain quality.

FIG. 9 also shows that operator interface control system 292 displays a scroll mechanism 366. The operator 230 or user can actuate scroll mechanism 366 to scroll through, and display, additional control map display elements. For example, as one zone display element (e.g., 284) scrolls off of the screen to the left, another one scrolls on from the right.

FIG. 9 also shows that user interface display 320 is broken generally into two sections, a scrollable display section 368, in which the operator 230 can use scroll mechanism 366 to scroll the display elements on and off the screen, and a fixed display section 370, in which the items displayed there are permanently displayed. In the example shown in FIG. 9, a ring-shaped display element 372 is shown for yield, as indicated by map descriptor display element 374. The quality display element 376 shows a quality value as well. For ring display element 372, the observed condition zone portion is represented at 378. The predicted condition zone portion is indicated by 380, and the current position of machine 100 is indicated by current position element 382.

Ring display 384 shows estimated and observed values for crop moisture content. This is indicated by map descriptor display element 386, and it has a quality value of 92%, as indicated by quality display element 388. The observed moisture values are shown in zone portion 390, and the predicted moisture values are shown in zone portion 392, while the current position of machine 100 is illustrated by current position display element 394.

It can be seen that display elements 372 and 384 also include an additional display element 396, and 398, respectively. Display sections 396 and 398 include a numeric value and a unit value. Display portion 396 shows that yield is currently 220 bushels per acre while moisture display element 384 shows that the crop moisture content is currently 14%.

Figure 10A:
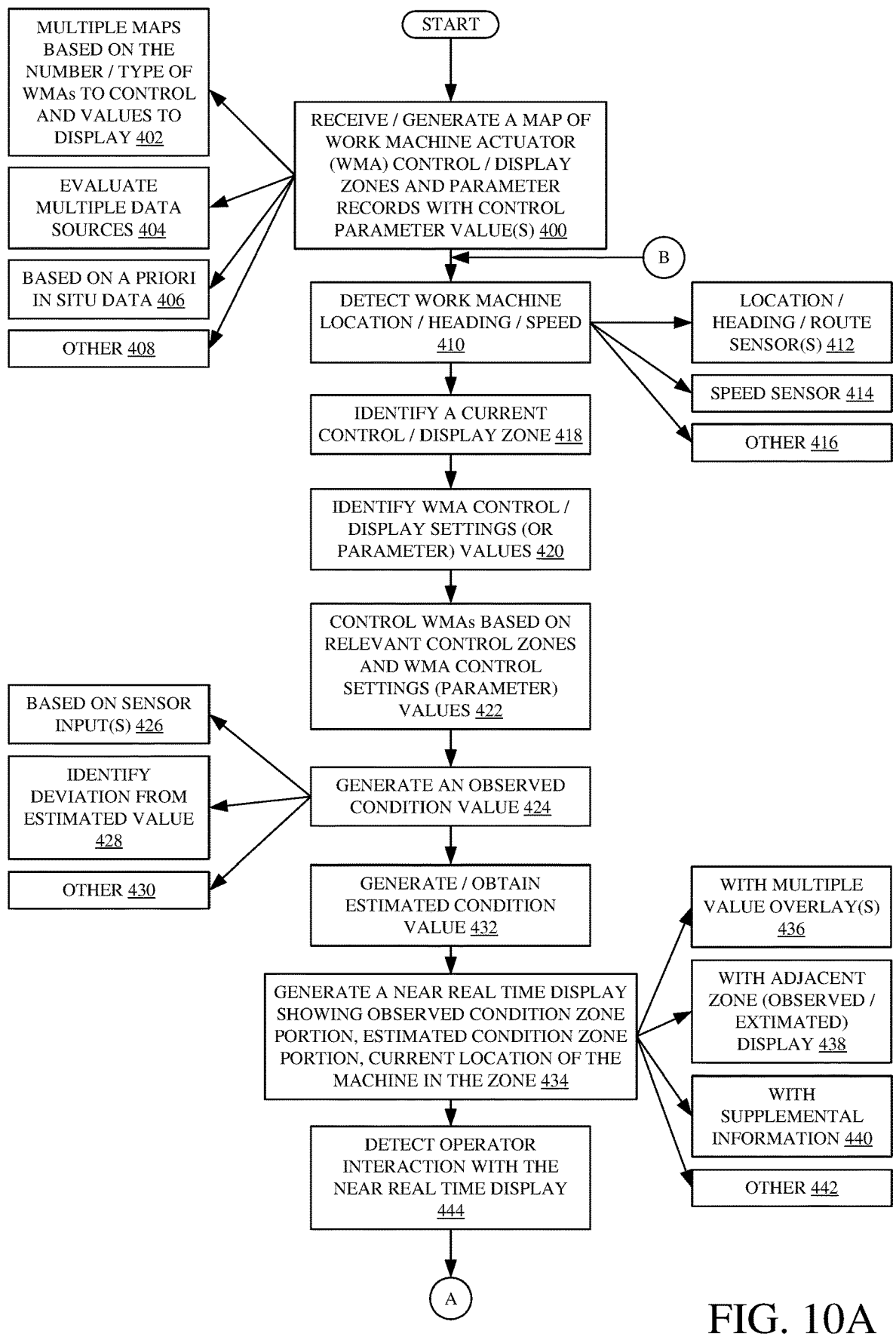
FIGS. 10A-10B (collectively referred to herein as FIG. 10) show a flow diagram illustrating one example of the operation of the work machine in detecting information and controlling the mobile work machine and displays, based on the detected information.
Figure 10B:
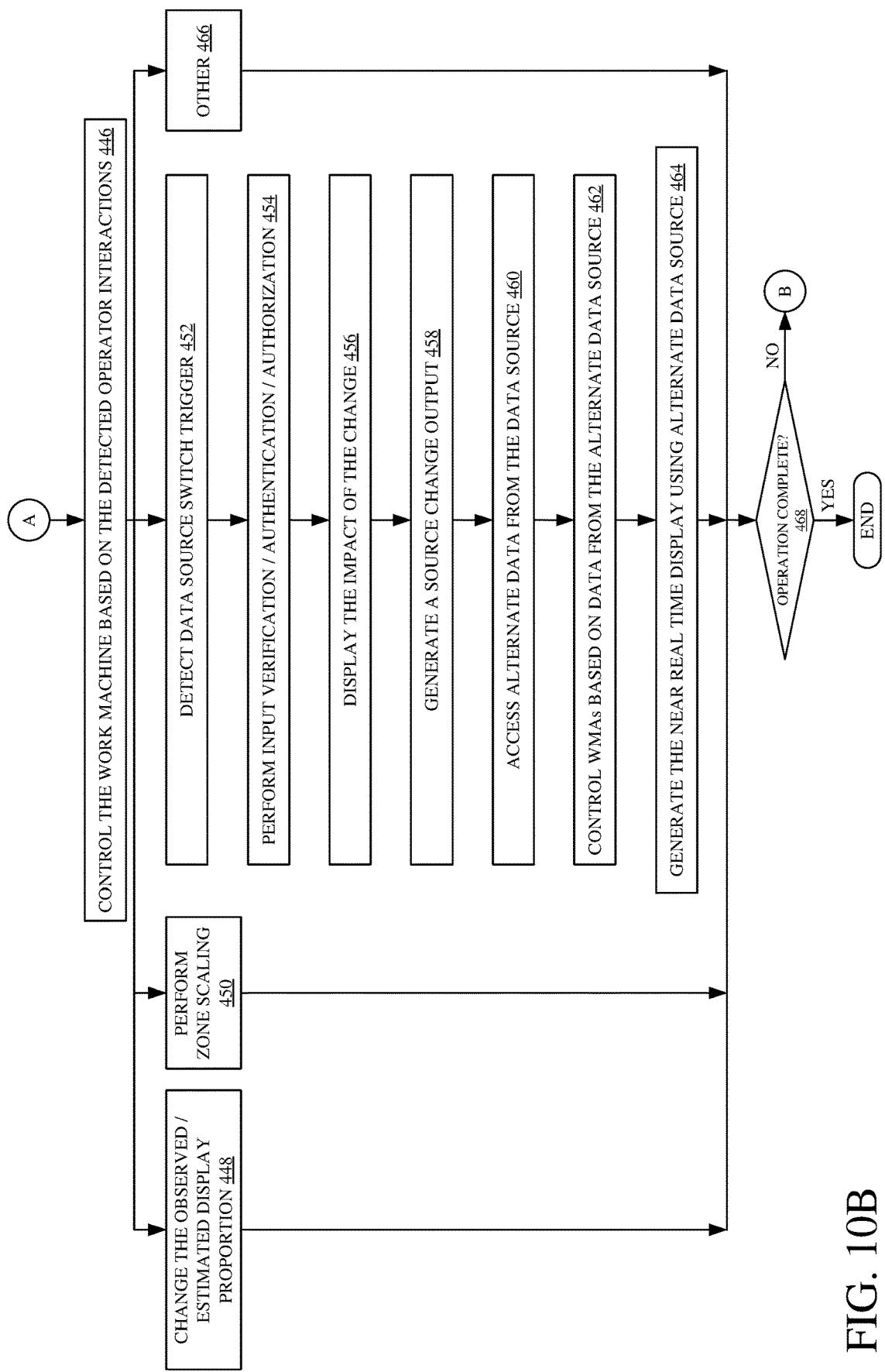

FIGS. 10A and 10B (collectively referred to herein as FIG. 10) show a flow diagram illustrating one example of the operation of machine 100, in generating a near real-time display window such as that described above, and in controlling machine 100.

It is first assumed that map selection logic 201 selects one or more maps 212-213 from data store 188 for controlling machine 100. The maps can have work machine actuator control values, estimated condition values, and control zones. Data store interaction component 202 also illustratively retrieves one or more parameter records 214-215 corresponding to the control zones in the selected map. This is indicated by block 400 in the flow diagram of FIG. 10. In one example, map selection logic 201 may select multiple maps based upon the number and types of WMAs that are controlled using the maps, and based upon the observed and estimated values that are to be displayed in the different display zones and zone portions of the display window. This is indicated by block 402. Also, map selection logic 201 may evaluate multiple different data sources in order to select the map. It illustratively selects the map that has data values from a data source that produces the highest quality data. This is indicated by block 404. The values can be based on a priori or in situ data, as indicated by block 406. The maps and parameter records can be obtained in a wide variety of other ways as well, and this is indicated by block 408.

Machine location identifier 200 receives an input from position system 157 and identifies a geographic location, heading and speed of work machine 100. This is indicated by block 410. This can be identified by a location/heading/route sensor or sensors 412. Machine location identifier 200 also identifies machine speed from a speed sensor 414. It can identify the location/heading/speed of work machine 100 in a wide variety of other ways as well, and this is indicated by block 416.

Current control zone identification system 204 then identifies which control zone machine 100 is operating in (the current control zone). This is based upon the geographic coordinates corresponding to the control zones in the selected map, and the geographic position of machine 100. This is indicated by block 418. WMA control parameter identification system 206 then identifies the WMA control settings and zone display values or parameter values corresponding to the current control zone. This is indicated by block 420. WMA control signal generator 208 then generates control signals to control the controllable subsystems 190 based upon the parameter and settings values corresponding to the control zones in the selected map. This is indicated by block 422 in the flow diagram of FIG. 10. Operator interface control system 192 then generates a near real time display in a display window based on the control zone values.

While machine 100 is traveling through the field, observed value generator 199 generates an observed condition value, for the observed conditions displayed on the observed condition zone portion of the display window for the current control zone in which machine 100 is operating. Generating the observed condition value is indicated by block 424 in the flow diagram of FIG. 10. This can be based on sensor inputs as indicated by block 426. Observed value generator 199 can also generate a value indicative of the deviation from the estimated (or predicted) condition value in the zone that machine 100 is operating in. This is indicated by block 428. Observed value generator 199 can perform other operations as well, and this is indicated by block 430.

Estimated condition zone display component 236 obtains a set of estimated condition values, that are to be displayed in the predicted condition zone portion of the display window. This is indicated by block 432. Current position display generator 232, observed condition zone display component 234 and estimated condition zone display component 236 then generate a near real-time display, in the display window, such as that shown in FIGS. 4-9, illustrating a displayed zone with an observed condition zone portion, a predicted condition zone portion and a current location of machine 100, within the current control zone. This is indicated by block 434.

As discussed above, multiple value overlay component 240 can overlay values of multiple different variables on the displayed zone as well. This is indicated by block 436. Adjacent zone display component 244 can obtain and display predicted and observed condition values for adjacent zones, that are adjacent to the current control zone in the field in which machine 100 is operating. This is indicated by block 438. Supplemental map display system 246 can obtain and display supplemental information, as discussed above. This is indicated by block 440. The near real-time display can be generated in a wide variety of other ways, with other display elements as well. This is indicated by block 442.

Operator interface control system 192 then detects any operator interaction (or other user interaction) with the near real-time display. This is indicated by block 444. It then controls the near real-time display, and provides output signals to other items in control system 186, in order to control the machine 100 based upon the detected operator interactions. This is indicated by block 446 in the flow diagram of FIG. 10.

As discussed above, the operator actions can take many different forms, and the resultant display control operations and machine control operations can thus take different forms as well. As discussed above with respect to FIG. 6, proportional zone display controller 238 can detect operator or user interactions that change the display window proportion devoted to zones portions 288 and 290. Changing the display proportion of the two zone portions 288 and 290 is indicated by block 448 in the flow diagram of FIG. 10.

Zone scaling component 242 can detect user or operator scaling inputs that scale one or both of zone portions 288 and 290 in the display window. This is also described above, and is indicated by block 450 in the flow diagram of FIG. 10.

Also, as described above, it may be that operator 230, or another user, may wish to change the display window and control operations performed on machine 100 so they are based on an alternate data source. In that case, switch trigger detector 270 detects a data source switch trigger. This can be a manual input or an automated trigger, as discussed above. This is indicated by block 452. Verification component 272 can perform an input verification, and authentication/authorization system 276 can authenticate the operator or user and perform an authorization process by which it is determined whether the authenticated user or operator is authorized to perform the data switch. Performing the input verification and authentication/authorization is indicated by block 454. Change impact component 274 generates a display (or other output) identifying the impact of the change, for the operator. This is indicated by block 456. Data source switching logic 277 then generates a source change output signal indicating that the data source for which the near real-time display is generated, and upon which machine 100 is controlled, is to be switched to an identified alternate data source. This is indicated by block 458. This output is provided to control system 186.

Data store interaction component 202 then accesses data from the alternate data source in data store 188. This may include obtaining a separate map 212-213, or a different set of parameter records 214-215, or other data. Accessing the data from the alternate data source is indicated by block 460 in the flow diagram of FIG. 10. WMA control signal generator 208 then generates control signals to control the controllable subsystems 190 of machine 100, based upon the values from the alternate data source. This is indicated by block 462. Operator interface control system 192 then generates the near real-time display in the display window using data from the alternate data source as well. This is indicated by block 464.

At block 446, the detected operator interactions can include a wide variety of other operator inputs. For instance, the operator 230 may actuate a scroll actuator, in which case elements on the near real-time display window may scroll across the display window horizontally or vertically. The operator inputs may include other operator inputs as well, and this is indicated by block 466.

Until the operation is complete, as indicated by block 468, then operation reverts back to block 410, where machine location identifier 200 continues to update the current location of the machine so that the near real-time display and control signals can be updated accordingly. Also, at any time, an alarm can be generated by alert signal generator 252. Some of examples of this were also discussed above.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present description also mentions a window or a display window. In one example, the window or display window is an area on a display screen in which information is viewed. There may be one or more contiguous, overlapping or overlayer windows forming an area for display. All of these possibilities, and others, are contemplated herein when referring to a window or display window.

Figure 11:
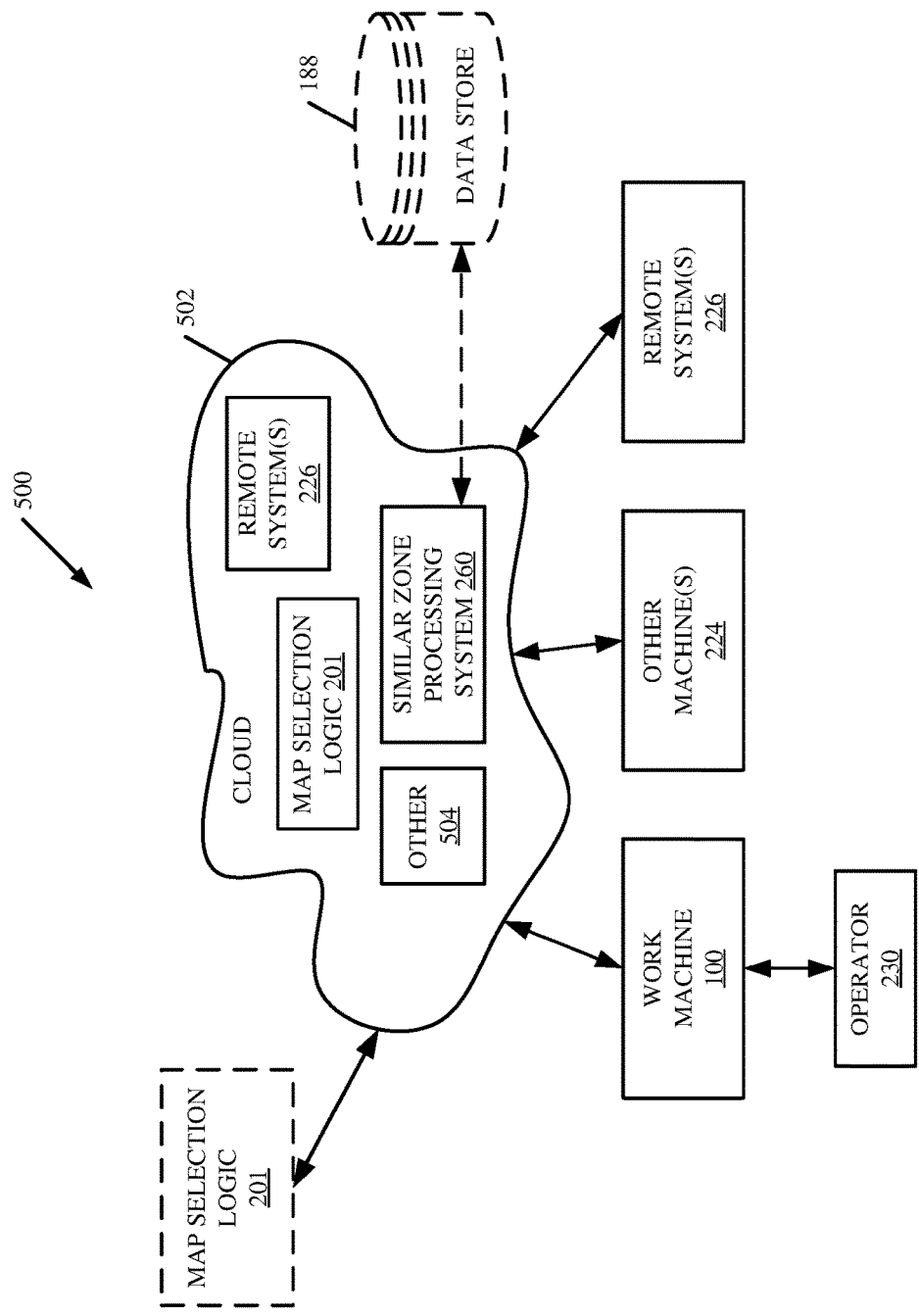
FIG. 11 is a block diagram showing one example of the work machine disposed in a remote server architecture.

FIG. 11 is a block diagram of harvester 100, shown in previous FIGS., except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIGS. 2 and 3 and they are similarly numbered. FIG. 11 specifically shows that map selection logic 201, remote systems 226 and data store 188 (and other items 504) can be located at a remote server location 502. Therefore, harvester 100 accesses those systems through remote server location 502.

FIG. 11 also depicts another example of a remote server architecture. FIG. 11 shows that it is also contemplated that some elements of previous Figures are disposed at remote server location 502 while others are not. By way of example, data store 188 or other parts of control system 186 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous Figures, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
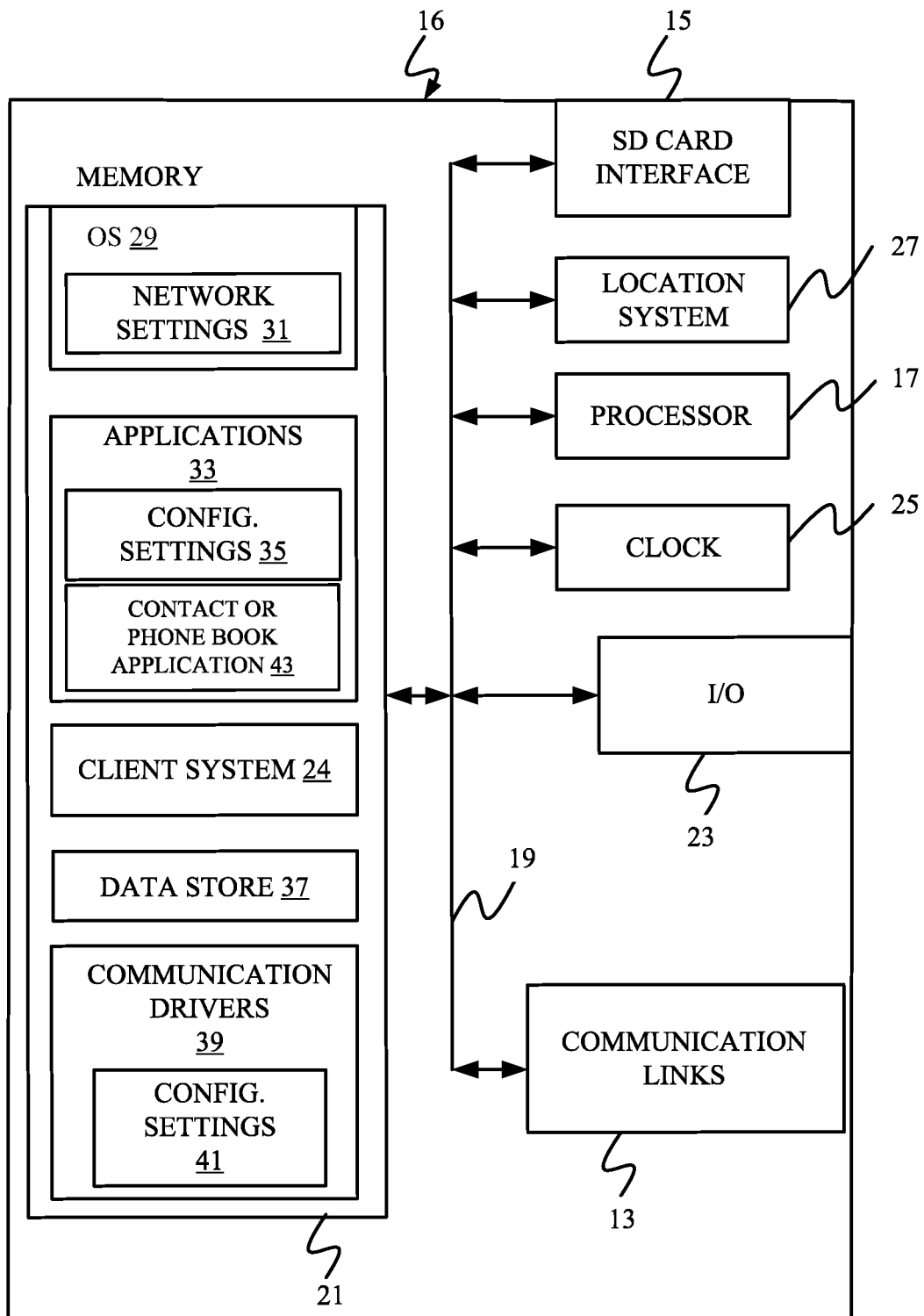
FIGS. 12-14 show examples of mobile devices that can be used with the work machine or architectures in previous figures.
Figure 13:
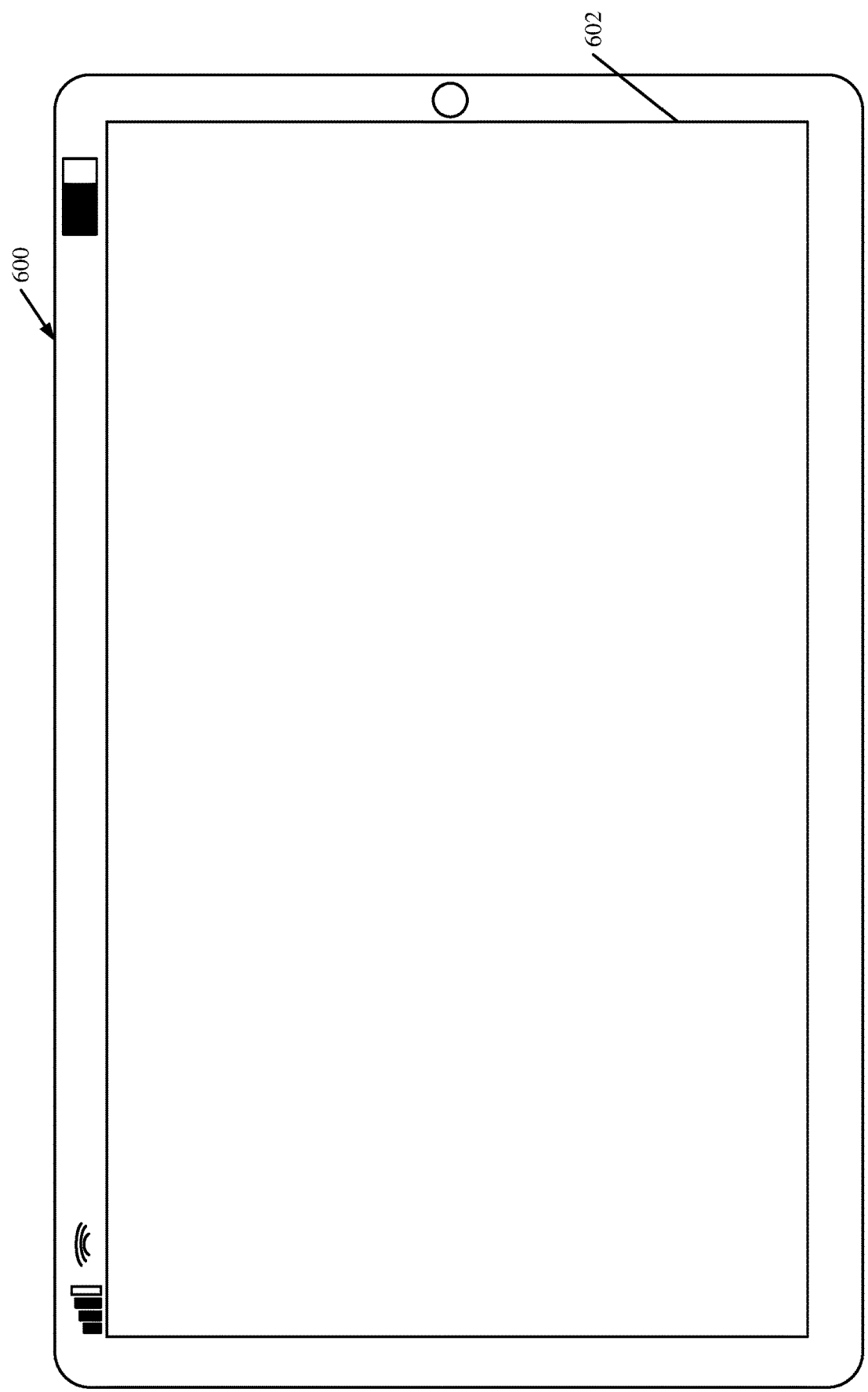
Figure 14:
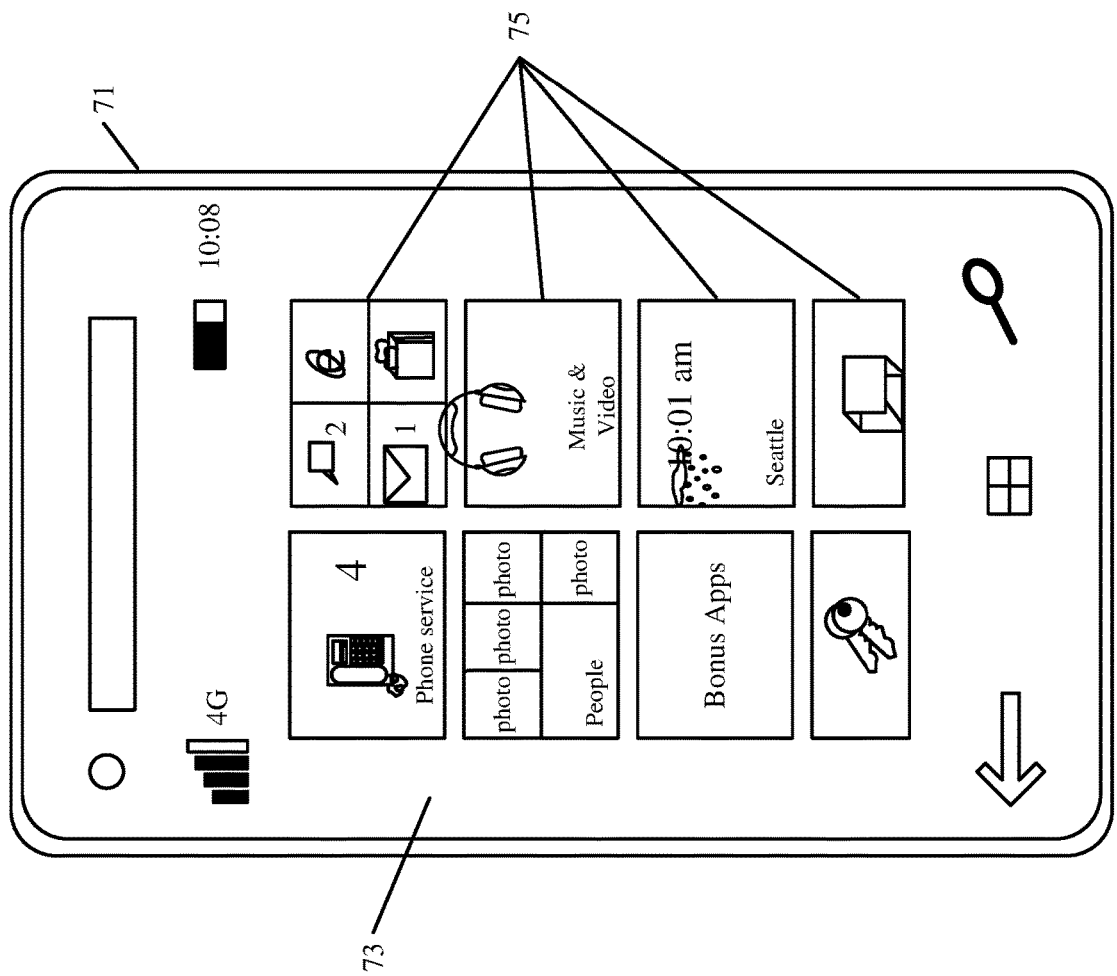

FIG. 12 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the data and detecting operator interactions. FIGS. 13-14 are examples of handheld or mobile devices.

FIG. 12 provides a general block diagram of the components of a client device 16 that can run some components shown in previous Figures, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from other Figures) along a bus 19 that is also connected to memory 21 and input/output (I/O) components 23, as well as clock 25 and location system 27.

VO components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
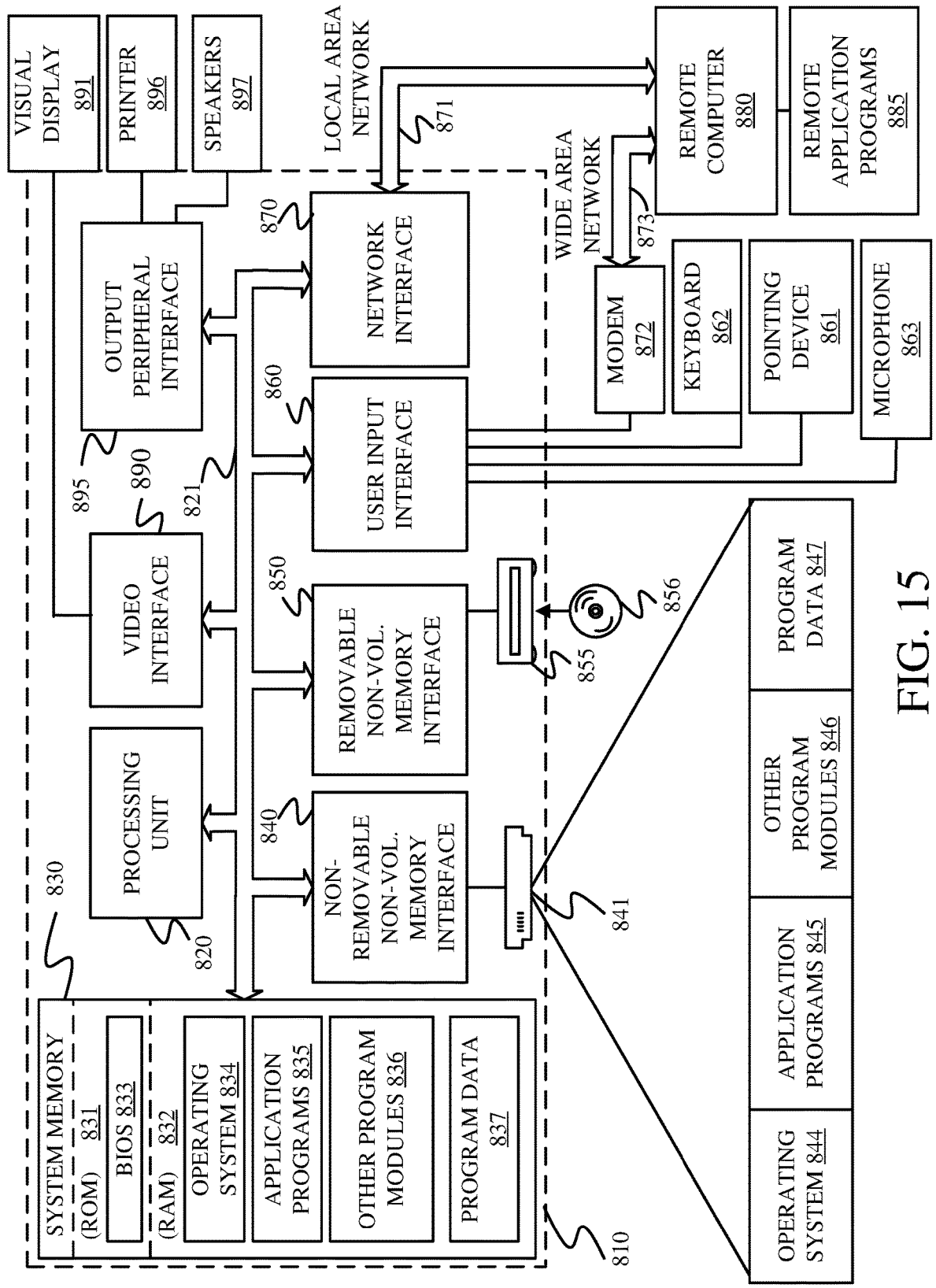
FIG. 15 is a block diagram showing one example of a computing environment that can be used in the work machine or architectures shown in previous figures.

FIG. 15 is one example of a computing environment in which elements of previous Figures, or parts of them, (for example) can be deployed. With reference to FIG. 15, an example system for implementing some embodiments includes a general-purpose computing device in the form of a computer 810 programmed to operate as described above. Components of computer 810 may include, but are not limited to, a processing unit 820 (which can comprise processor 180), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer implemented method of controlling a mobile work machine, comprising:

obtaining a map of a worksite that divides the worksite into control zones;

identifying a current control zone in which the mobile work machine is operating;

detecting a current location of the mobile work machine in the current control zone;

determining a set of observed condition values, each indicative of an observed value of a variable characterizing a condition in a geographic portion of the current control zone on which the mobile work machine has already performed an operation;

obtaining a set of estimated condition values, each indicative of an estimated value of the variable characterizing the condition in a portion of the current control zone on which the mobile work machine has yet to perform the operation; and generating a near real time display, in a display window, of at least a portion of the current control zone showing an estimated value zone portion with visual indicia indicative of the set of estimated condition values, an observed value zone portion with visual indicia indicative of the set of observed condition values, and a current location indicator indicating the current location of the mobile work machine in the current control zone.

Example 2 is the computer implemented method of any or all previous examples and further comprising:

controlling a work machine actuator based on the set of estimated condition values and the current location of the mobile work machine.

Example 3 is the computer implemented method of any or all previous examples wherein generating a near real time display of a portion of the current control zone comprises:

displaying the portion of the current control zone with a zone display element, a first part of the zone display element displaying the estimated value zone portion, a second part of the zone display element displaying the observed value zone portion and a third part of the zone display element displaying the current location indicator, the current location indicator being displayed between the first and second parts of the zone display element.

Example 4 is the computer implemented method of any or all previous examples and further comprising:

detecting a proportional display user input indicative of a change in size of at least one of the first and second parts of the zone display element; and modifying the near real time display, in the display window, to change sizes of both of the first and second parts of the zone display element, relative to one another, based on the detected proportional display user input.

Example 5 is the computer implemented method of any or all previous examples wherein displaying the at least a portion of the current control zone comprises:

displaying the first part of the zone display element, with the estimated condition values corresponding to a plurality of locations along a first length in the current control zone at the worksite, according to a first scale value, the first scale value indicating a relationship between a linear distance in the current control zone at the worksite, corresponding to the first part of the zone display element in the current control zone, and a linear distance of the display window consumed by the first part of the zone display element; and displaying the second part of the zone display element, with the observed condition values at a plurality of locations along a second length in the current control zone at the worksite, according to a second scale value, the second scale value indicating a relationship between a linear distance in the current control zone at the worksite, corresponding to the second part of the zone display element, and a linear distance in the display window consumed by the second part of the zone display element.

Example 6 is the computer implemented method of any or all previous examples and further comprising:

detecting a zone scaling user input relative to one of the first and second parts of the zone display element;

modifying the first scale value or the second scale value, corresponding to the one of the first and second parts of the zone display element, to obtain a modified scale value, independently of the other of the first scale value or the second scale value; and displaying the zone display element using the modified scale value.

Example 7 is the computer implemented method of any or all previous examples wherein obtaining a set of estimated condition values comprises:

obtaining the set of estimated condition values from a first data source having a first data quality indicated by a first quality metric.

Example 8 is the computer implemented method of any or all previous examples and further comprising:

detecting a data source switch trigger indicative of a data source switch to an alternate data source;

accessing alternate data, indicative of alternate estimated condition values, from the alternate data source; and generating the near real time display based on the alternate estimated condition values.

Example 9 is the computer implemented method of any or all previous examples and further comprising:

displaying an impact indicator, indicative of an impact of switching to the alternate data source, prior to accessing the alternate data.

Example 10 is the computer implemented method of any or all previous examples wherein generating the near real time display comprises:

generating visual indicia simultaneously indicative of multiple different types of conditions in the current control zone.

Example 11 is the computer implemented method of any or all previous examples wherein generating the near real time display comprises:

generating an adjacent zone display element showing at least one of an estimated value zone portion and an observed value zone portion for a zone that is adjacent the current control zone in the worksite.

Example 12 is the computer implemented method of any or all previous examples wherein generating the near real time display comprises:

generating an alternate data source display element identifying the alternate data source; and generating an alternate data source quality metric display element indicative of a quality of the alternate data from the alternate data source.

Example 13 is the computer implemented method of any or all previous examples wherein the alternate data source display element is a user actuatable display element and wherein detecting the data source switch trigger comprises:

detecting user actuation of the alternate data source display element.

Example 14 is the computer implemented method of any or all previous examples and further comprising:

determining a first set of observed condition values, indicative of a set of observed values of a first variable characterizing a first condition in a geographic portion of the current control zone on which the mobile work machine has already performed an operation, determining a second set of observed condition values, indicative of a set of observed values of a second variable characterizing a second condition in a geographic portion of the current control zone on which the mobile work machine has already performed an operation, obtaining a first set of estimated condition values, indicative of a set of estimated values of the first variable characterizing the first condition in the geographic portion of the current control zone on which the mobile work machine has yet to perform the operation;

obtaining a second set of estimated condition values, indicative of a set of estimated values of the second variable characterizing the second condition in the geographic portion of the current control zone on which the mobile work machine has yet to perform the operation;

generating a first near real time display in the display window, of at least a portion of the current control zone showing a first estimated value zone portion with visual indicia indicative of the first set of estimated condition values, a first observed value zone portion with visual indicia indicative of the first set of observed condition values, and a current location indicator indicating the current location of the mobile work machine in the current control zone; and generating a second near real time display, in the display window, of at least a portion of the current control zone, while generating the first real time display, in the display window, of the at least a portion of the current control zone, showing a second estimated value zone portion with visual indicia indicative of the second set of estimated condition values, a second observed value zone portion with visual indicia indicative of the second set of observed condition values, and a current location indicator indicating the current location of the mobile work machine in the current control zone.

Example 15 is a control system for a mobile work machine, comprising:

a data store interaction component that obtains a map of a worksite that geographically divides the worksite into zones;

a current zone identification system that identifies a current control zone in which the mobile work machine is operating;

a machine location identifier that detects a current location of the mobile work machine in the current control zone;

an observed condition value generator that determines a set of observed condition values, each indicative of an observed value of a variable characterizing a condition in a geographic portion of the current control zone on which the mobile work machine has already performed an operation;

an estimated condition display component that obtains a set of estimated condition values, each indicative of an estimated value of the variable characterizing the condition in a geographic portion of the current control zone on which the mobile work machine has yet to perform the operation; and an operator interface control system that generates a near real time display, in a display window, of at least a portion of the current control zone showing an estimated value zone portion with visual indicia indicative of the set of estimated condition values, an observed value zone portion with visual indicia indicative of the set of observed condition values, and a current location indicator indicating the current location of the mobile work machine in the current control zone.

Example 16 is the control system of any or all previous examples wherein the estimated condition display component obtains the set of estimated condition values from a first data source having a first data quality indicated by a first quality metric, and further comprising:

data source switching logic configured to detect a data source switch trigger indicative of a data source switch to an alternate data source, and access alternate data, indicative of alternate estimated condition values, from the alternate data source wherein the operator interface control system generates the near real time display based on the alternate estimated condition values.

Example 17 is the control system of any or all previous examples wherein the operator interface control system generates a near real time display of the at least a portion of the current control zone by displaying a zone display element wherein a first part of the zone display element displays the estimated value zone portion, a second part of the zone display element displays the observed value zone portion and a third part of the zone display element displays the current location indicator, the current location indicator being displayed between the first and second parts of the zone display element and further comprising:

a proportional zone display controller detecting a proportional display user input, indicative of a change in size of at least one of the first and second parts of the zone display element in the display window, and modifying the near real time display to change sizes of both of the first and second parts of the zone display element in the display window, relative to one another, based on the detected proportional display user input.

Example 18 is the control system of any or all previous examples wherein the operator interface control system comprises:

an estimated condition zone display component that displays the first part of the zone display element with the estimated condition values corresponding to a plurality of locations along a first length, at the worksite, corresponding to the current control zone according to a first scale value, the first scale value indicating a relationship between a linear distance in the current control zone at the worksite, corresponding to the first part of the zone display element in the current control zone, and a linear distance of the display window consumed by the first part of the zone display element;

an observed condition zone display component that displays the second part of the zone display element with the observed condition values at a plurality of locations along a second length, at the worksite, corresponding to the current control zone according to a second scale value, the second scale value indicating a relationship between a linear distance in the current control zone at the worksite, corresponding to the second part of the zone display element, and a linear distance in the display window consumed by the second part of the zone display element; and a zone scaling component that detects a zone scaling user input relative to one of the first and second parts of the zone display element and modifies the first scale value or the second scale value, corresponding to the one of the first and second parts of the zone display element, to obtain a modified scale value, independently of the other of the first scale value or the second scale value, the operator interface control system displaying the zone display element using the modified scale value.

Example 19 is a computer implemented method of controlling a mobile work machine, comprising:

obtaining a map of a worksite that divides the worksite into zones corresponding to different geographic areas at the worksite;

identifying a current control zone in which the mobile work machine is operating;

detecting a current location of the mobile work machine in the current control zone;

determining a set of observed condition values, each indicative of an observed value of a variable characterizing a condition in a geographic portion of the current control zone on which the mobile work machine has already performed an operation;

obtaining, from a first data source, a set of estimated condition values, each indicative of an estimated value of the variable characterizing the condition in the geographic portion of the current control zone on which the mobile work machine has yet to perform the operation;

generating a near real time display of at least a portion of the current control zone showing an estimated value zone portion with visual indicia indicative of the set of estimated condition values, an observed value zone portion with visual indicia indicative of the set of observed condition values, and a current location indicator indicating the current location of the mobile work machine in the current control zone;

generating an alternate data source display element identifying an alternate data source and an alternate data source quality metric display element indicative of a quality of the alternate data from the alternate data source; and controlling a work machine actuator based on the set of estimated condition values and the current location of the mobile work machine.

Example 20 is the computer implemented method of any or all previous examples wherein generating the near real time display comprises:

generating an adjacent zone display element showing at least one of an estimated value zone portion and an observed value zone portion for a control zone that is adjacent the current control zone at the worksite.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling a mobile work machine, the computer implemented method comprising:
   obtaining a map of a worksite that divides the worksite into control zones;
   identifying a current control zone in which the mobile work machine is operating;
   detecting a current location of the mobile work machine in the current control zone;
   determining a set of observed condition values, each observed condition value, of the set of observed condition values, indicative of an observed value of a variable characterizing a condition in a geographic portion of the current control zone on which the mobile work machine has already performed an operation;
   obtaining a set of estimated condition values, each estimated condition value, of the set of estimated condition values, indicative of an estimated value of the variable characterizing the condition in a portion of the current control zone on which the mobile work machine has yet to perform the operation; and
   generating a display, in a display window, of at least a portion of the current control zone, wherein generating the display comprises:
      displaying the at least a portion of the current control zone with a zone display element, wherein displaying the at least a portion of the current control zone with the zone display element comprises:
         displaying a first part of the zone display element showing an estimated value zone portion with visual indicia indicative of the set of estimated condition values corresponding to a plurality of locations along a first length in the current control zone according to a first scale value, the first scale value indicating a relationship between a linear distance in the current control zone at the worksite, corresponding to the first part of the zone display element in the current control zone, and a linear distance of the display window consumed by the first part of the zone display element;
         displaying a second part of the zone display portion that displays an observed value zone portion with visual indicia indicative of the set of observed condition values corresponding to a plurality of locations along a second length in the current control zone at the worksite, according to a second scale value, the second scale value indicating a relationship between a linear distance in the current control zone at the worksite, corresponding to the second part of the zone display element, and a linear distance in the display window consumed by the second part of the zone display element; and
         displaying a third part of the zone display element that displays a current location indictor indicating the current location of the mobile work machine in the current control zone, the current location indicator being displayed between the first and second parts of the zone display element.

2. The computer implemented method of claim 1 and further comprising:
   controlling a work machine actuator based on the set of estimated condition values and the current location of the mobile work machine.

3. The computer implemented method of claim 1 and further comprising:
   detecting a proportional display user input indicative of a change in size of at least one of the first and second parts of the zone display element; and
   modifying the display, in the display window, to change sizes of both of the first and second parts of the zone display element, relative to one another, based on the detected proportional display user input.

4. The computer implemented method of claim 1 and further comprising:
   detecting a zone scaling user input relative to one of the first and second parts of the zone display element;
   modifying the first scale value or the second scale value, corresponding to the one of the first and second parts of the zone display element, to obtain a modified scale value, independently of the other of the first scale value or the second scale value; and
   displaying the zone display element using the modified scale value.

5. The computer implemented method of claim 1, wherein obtaining a set of estimated condition values comprises:
   obtaining the set of estimated condition values from a first data source having a first data quality indicated by a first quality metric.

6. The computer implemented method of claim 5 and further comprising:
   detecting a data source switch trigger indicative of a data source switch to an alternate data source;
   accessing alternate data, indicative of alternate estimated condition values, from the alternate data source; and
   generating the display based on the alternate estimated condition values.

7. The computer implemented method of claim 6 and further comprising:
   displaying an impact indicator, indicative of an impact of switching to the alternate data source, prior to accessing the alternate data.

8. The computer implemented method of claim 1, wherein generating the display comprises:
   generating visual indicia simultaneously indicative of multiple different types of conditions in the current control zone.

9. The computer implemented method of claim 1, wherein generating the display comprises:
   generating an adjacent zone display element showing at least one of an estimated value zone portion and an observed value zone portion for a zone that is adjacent the current control zone in the worksite.

10. The computer implemented method of claim 6, wherein generating the display comprises:
    generating an alternate data source display element identifying the alternate data source; and
    generating an alternate data source quality metric display element indicative of a quality of the alternate data from the alternate data source.

11. The computer implemented method of claim 10 wherein the alternate data source display element is a user actuatable display element and wherein detecting the data source switch trigger comprises:
    detecting user actuation of the alternate data source display element.

12. The computer implemented method of claim 1 and further comprising:

determining a first set of observed condition values, indicative of a set of observed values of a first variable characterizing a first condition in a geographic portion of the current control zone on which the mobile work machine has already performed an operation, determining a second set of observed condition values, indicative of a set of observed values of a second variable characterizing a second condition in a geographic portion of the current control zone on which the mobile work machine has already performed an operation, obtaining a first set of estimated condition values, indicative of a set of estimated values of the first variable characterizing the first condition in the geographic portion of the current control zone on which the mobile work machine has yet to perform the operation;

obtaining a second set of estimated condition values, indicative of a set of estimated values of the second variable characterizing the second condition in the geographic portion of the current control zone on which the mobile work machine has yet to perform the operation;

generating a first display in the display window, of at least a portion of the current control zone showing a first estimated value zone portion with visual indicia indicative of the first set of estimated condition values, a first observed value zone portion with visual indicia indicative of the first set of observed condition values, and a current location indicator indicating the current location of the mobile work machine in the current control zone; and generating a second display, in the display window, of at least a portion of the current control zone, while generating the first display, in the display window, of the at least a portion of the current control zone, showing a second estimated value zone portion with visual indicia indicative of the second set of estimated condition values, a second observed value zone portion with visual indicia indicative of the second set of observed condition values, and a current location indicator indicating the current location of the mobile work machine in the current control zone.

13. A control system for a mobile work machine, the control system comprising:

a data store interaction component that obtains a map of a worksite that geographically divides the worksite into control zones;

a current zone identification system that identifies a current control zone in which the mobile work machine is operating;

a machine location identifier that detects a current location of the mobile work machine in the current control zone;

an observed condition value generator that determines a set of observed condition values, each indicative of an observed value of a variable characterizing a condition in a geographic portion of the current control zone on which the mobile work machine has already performed an operation;

an estimated condition display component that obtains a set of estimated condition values from a first data source having a first data quality indicated by a first quality metric, each estimated condition value, in the set of estimated condition values, indicative of an estimated value of the variable characterizing the condition in a geographic portion of the current control zone on which the mobile work machine has yet to perform the operation;

data source switching logic configured to detect a data source switch trigger indicative of a data source switch to an alternate data source, and access, from the alternate data source, alternate data, indicative of a set of alternate estimated condition values, each alternate estimated condition value, in the set of alternate estimated condition values, indicative of an alternate estimated value of the variable characterizing the condition in a geographic portion of the current control zone on which the mobile work machine has Yet to perform the operation; and an operator interface control system that generates a display, in a display window, the display including:
a zone display element that represents at least a portion of the current control zone;
an estimated value zone portion, within the zone display element, with visual indicia indicative of either the set of estimated condition values or the set of alternate estimated condition values;
an observed value zone portion, within the zone display element, with visual indicia indicative of the set of observed condition values; and
a current location indicator, within the zone display element, indicating the current location of the mobile work machine in the current control zone.

14. The control system of claim 13 wherein the current location indicator is displayed between the estimated value zone portion and the observed value zone portion and further comprising:
a proportional zone display controller detecting a proportional display user input, indicative of a change in size of at least one of the estimated value zone portion and the observed value zone portion in the display window, and modifying the display to change sizes of both of the estimated value zone portion and the observed value zone portion in the display window, relative to one another, based on the detected proportional display user input.

15. The control system of claim 13 wherein the estimated value zone portion is displayed according to a first scale value, the first scale value indicating a relationship between a linear distance in the current control zone at the worksite and a linear distance of the display window consumed by the estimated value zone portion;
wherein the observed value zone portion is displayed according to a second scale value, the second scale value indicating a relationship between a linear distance in the current control zone at the worksite and a linear distance of the display window consumed by the observed value zone portion; and
wherein the operator interface control system comprises:
a zone scaling component that detects a zone scaling user input relative to one of the estimated value zone portion and the observed value zone portion and modifies the first scale value or the second scale value, corresponding to the one of the estimated value zone portion and the observed value zone portion, to obtain a modified scale value, independently of the other of the first scale value or the second scale value, the operator interface control system modifying the display based on the modified scale value.

16. A computer implemented method of controlling a mobile work machine, comprising:

obtaining a map of a worksite that divides the worksite into zones corresponding to different geographic areas at the worksite;

identifying a current control zone in which the mobile work machine is operating;

detecting a current location of the mobile work machine in the current control zone;

determining a set of observed condition values, each indicative of an observed value of a variable characterizing a condition in a geographic portion of the current control zone on which the mobile work machine has already performed an operation;

obtaining, from a first data source, a set of estimated condition values, each indicative of an estimated value of the variable characterizing the condition in the geographic portion of the current control zone on which the mobile work machine has yet to perform the operation;

generating a display of at least a portion of the current control zone showing an estimated value zone portion with visual indicia indicative of the set of estimated condition values, an observed value zone portion with visual indicia indicative of the set of observed condition values, and a current location indicator indicating the current location of the mobile work machine in the current control zone;

generating an alternate data source display element identifying an alternate data source and an alternate data source quality metric display element indicative of a quality of the alternate data from the alternate data source; and controlling a work machine actuator based on the set of estimated condition values and the current location of the mobile work machine.

17. The computer implemented method of claim 16 wherein generating the display comprises:

generating an adjacent zone display element showing at least one of an estimated value zone portion and an observed value zone portion for a control zone that is adjacent the current control zone at the worksite.

18. A computer implemented method of controlling a mobile work machine, the computer implemented method comprising:

obtaining a map of a worksite that divides the worksite into control zones;

identifying a current control zone in which the mobile work machine is operating;

detecting a current location of the mobile work machine in the current control zone;

determining a first set of observed condition values, each observed condition value, of the first set of observed condition values, indicative of an observed value of a first variable characterizing a first condition in a geographic portion of the current control zone on which the mobile work machine has already performed an operation;

determining a second set of observed condition values, each observed condition value, of the second set of observed condition values, indicative of an observed value of a second variable characterizing a second condition in a geographic portion of the current control zone on which the mobile work machine has already performed an operation obtaining a first set of estimated condition values, each estimated condition value, of the first set of estimated condition values, indicative of an estimated value of the first variable characterizing the first condition in a portion of the current control zone on which the mobile work machine has yet to perform the operation;

obtaining a second set of estimated condition values, each estimated condition value, of the second set of estimated condition values, indicative of an estimated value of the second variable characterizing the second condition in a portion of the current control zone on which the mobile work machine has yet to perform the operation generating a first display, in a display window, of at least a portion of the current control zone showing a first estimated value zone portion with visual indicia indicative of the first set of estimated condition values, a first observed value zone portion with visual indicia indicative of the first set of observed condition values, and a current location indicator indicating the current location of the mobile work machine in the current control zone; and generating a second display, in the display window, of at least a portion of the current control zone, while generating the first display, in the display window, of the at least a portion of the current control zone, showing a second estimated value zone portion with visual indicia indicative of the second set of estimated condition values, a second observed value zone portion with visual indicia indicative of the second set of observed condition values, and a current location indicator indicating the current location of the mobile work machine in the current control zone.

19. A control system for a mobile work machine, the control system comprising:

a data store interaction component that obtains a map of a worksite that geographically divides the worksite into control zones;

a current zone identification system that identifies a current control zone in which the mobile work machine is operating;

a machine location identifier that detects a current location of the mobile work machine in the current control zone;

an observed condition value generator that determines a set of observed condition values, each indicative of an observed value of a variable characterizing a condition in a geographic portion of the current control zone on which the mobile work machine has already performed an operation;

an estimated condition display component that obtains a set of estimated condition values, each indicative of an estimated value of the variable characterizing the condition in a geographic portion of the current control zone on which the mobile work machine has yet to perform the operation; and an operator interface control system that generates a display, in a display window, the display including:

a zone display element that represents at least a portion of the current control zone;

an estimated value zone portion, within the zone display element, with visual indicia indicative of the set of estimated condition values, the estimated value zone portion displayed according to a first scale value, the first scale value indicating a relationship between a linear distance in the current control zone at the worksite and a linear distance of the display window consumed by the estimated value zone portion;

an observed value zone portion, within the zone display element, with visual indicia indicative of the set of observed condition values, the observed value zone portion displayed according to a second scale value, the second scale value indicating a relationship between a linear distance in the current control zone at the worksite and a linear distance of the display window consumed by the observed value zone portion; and a current location indicator, within the zone display element, indicating the current location of the mobile work machine in the current control zone; and wherein the operator interface control system comprises a zone scaling component that detects a zone scaling user input relative to one of the estimated value zone portion and the observed value zone portion and modifies the first scale value or the second scale value, corresponding to the one of the estimated value zone portion and the observed value zone portion, to obtain a modified scale value, independently of the other of the first scale value or the second scale value, the operator interface control system modifying the display based on the modified scale value.

\* \* \* \* \*